(12) United States Patent
Edelson

(10) Patent No.: US 7,105,938 B2
(45) Date of Patent: Sep. 12, 2006

(54) ELECTRONICALLY CONTROLLED ENGINE GENERATOR SET

(75) Inventor: Jonathan Sidney Edelson, Somerville, MA (US)

(73) Assignee: Borealis Technical Limited, (GI)

( * ) Notice: Subject to any disclaimer, the term of this patent is extended or adjusted under 35 U.S.C. 154(b) by 0 days.

(21) Appl. No.: 11/000,612

(22) Filed: Nov. 30, 2004

(65) Prior Publication Data

US 2005/0116474 A1 Jun. 2, 2005

Related U.S. Application Data

(62) Division of application No. 09/675,082, filed on Sep. 28, 2000, now Pat. No. 6,825,575.

(60) Provisional application No. 60/156,402, filed on Sep. 28, 1999.

(51) Int. Cl.
H02P 9/04 (2006.01)

(52) U.S. Cl. .................. 290/40 A; 322/16; 180/65.2

(58) Field of Classification Search .......... 290/40 C, 290/40 A; 322/16, 28; 180/65.2
See application file for complete search history.

(56) References Cited

U.S. PATENT DOCUMENTS

| | | | |
|---|---|---|---|
| 3,101,627 A * | 8/1963 | Linsley et al. ............. 477/68 |
| 3,612,892 A | 10/1971 | Nobile et al. | |
| 3,701,556 A | 10/1972 | Richmond | |
| 3,705,721 A | 12/1972 | Lulay et al. | |
| 3,791,473 A * | 2/1974 | Rosen ................. 180/65.2 |
| 3,812,411 A * | 5/1974 | Johnson et al. ........... 318/376 |
| 3,878,400 A | 4/1975 | McSparran | |
| 3,970,858 A | 7/1976 | Rist et al. | |
| 4,173,119 A | 11/1979 | Greune et al. | |
| 4,184,083 A | 1/1980 | Takeuchi | |
| 4,253,308 A | 3/1981 | Eggenberger et al. | |
| 4,307,690 A | 12/1981 | Rau et al. | |
| 4,367,708 A | 1/1983 | Nakamura et al. | |
| 4,401,938 A | 8/1983 | Cronin | |
| 4,455,492 A | 6/1984 | Guelpa | |
| 4,455,525 A * | 6/1984 | Morishita et al. ............. 322/28 |
| 4,498,016 A | 2/1985 | Earleson et al. | |
| 4,511,807 A | 4/1985 | Somerville | |
| 4,563,630 A | 1/1986 | Woodward et al. | |
| 4,629,968 A | 12/1986 | Butts et al. | |
| 4,661,761 A | 4/1987 | Katsumata | |
| 4,668,872 A | 5/1987 | Lerouge et al. | |
| 4,682,044 A | 7/1987 | Hotate et al. | |
| 4,699,097 A * | 10/1987 | Tanaka et al. ........... 123/192.1 |
| 4,743,812 A | 5/1988 | Dishner | |
| 4,777,425 A | 10/1988 | MacFarlane | |
| 4,789,817 A | 12/1988 | Asakura et al. | |
| 4,877,273 A | 10/1989 | Wazaki et al. | |
| 4,888,493 A | 12/1989 | Fluegel | |
| 4,994,684 A | 2/1991 | Lauw et al. | |
| 5,006,781 A | 4/1991 | Schultz et al. | |

(Continued)

FOREIGN PATENT DOCUMENTS

JP 02169825 A * 6/1990

Primary Examiner—Joseph Waks

(57) ABSTRACT

An electronically controlled electrical power generator comprises a generator driven by a heat engine, operated by control means, and carrying an electrical load. Operation of the heat engine is at wide open throttle. Control over engine operation and electrical output of the generator is achieved by electronically manipulating the electric load, and/or adjusting excitation levels at the generator's magnetic fields, so as to change engine/generator equilibrium speed. In a beneficial embodiment, the generator is powered by an energy storage unit, to temporarily act as a motor and rotate the engine when starting, and during power absorbing strokes.

16 Claims, 15 Drawing Sheets

U.S. PATENT DOCUMENTS

| | | | |
|---|---|---|---|
| 5,020,491 A * | 6/1991 | Mashino | 123/192.1 |
| 5,028,804 A | 7/1991 | Lauw | |
| 5,056,487 A | 10/1991 | Yamakado et al. | |
| 5,080,059 A | 1/1992 | Yoshida et al. | |
| 5,115,183 A | 5/1992 | Kyoukane et al. | |
| 5,117,931 A | 6/1992 | Nishida | |
| 5,144,220 A | 9/1992 | Iwatani et al. | |
| 5,198,698 A | 3/1993 | Paul et al. | |
| 5,256,959 A | 10/1993 | Nagano et al. | |
| 5,264,764 A | 11/1993 | Kuang | |
| 5,311,063 A | 5/1994 | Hubler | |
| 5,345,154 A | 9/1994 | King | |
| 5,473,228 A | 12/1995 | Nii | |
| 5,552,640 A | 9/1996 | Sutton et al. | |
| 5,587,647 A | 12/1996 | Bansal et al. | |
| 5,589,743 A | 12/1996 | King | |
| 5,608,308 A | 3/1997 | Kiuchi et al. | |
| 5,608,310 A | 3/1997 | Watanabe | |
| 5,614,809 A | 3/1997 | Kiuchi et al. | |
| 5,621,304 A | 4/1997 | Kiuchi et al. | |
| 5,691,576 A | 11/1997 | Minks | |
| 5,703,410 A | 12/1997 | Maekawa | |
| 5,730,094 A * | 3/1998 | Morris | 123/192.1 |
| 5,751,069 A | 5/1998 | Rajashekara et al. | |
| 5,763,977 A * | 6/1998 | Shimasaki et al. | 310/191 |
| 5,832,896 A | 11/1998 | Phipps | |
| 5,959,420 A | 9/1999 | Boberg et al. | |
| 6,037,672 A | 3/2000 | Grewe | |
| 6,051,951 A * | 4/2000 | Arai et al. | 318/700 |
| 6,054,844 A * | 4/2000 | Frank | 322/16 |
| 6,330,873 B1 | 12/2001 | Letang et al. | |
| 6,464,026 B1 * | 10/2002 | Horsley et al. | 180/65.2 |
| 6,809,429 B1 * | 10/2004 | Frank | 290/40 C |

* cited by examiner

ELECTRONICALLY CONTROLLED ENGINE GENERATOR SET

CROSS-REFERENCE TO RELATED APPLICATIONS

This application is a divisional application of application Ser. No. 09/675,082 filed Sep. 28, 2000, now U.S. Pat. No. 6,825,575 which claims the benefit of U.S. Provisional Application No. 60/156,402, filed Sep. 28, 1999. The above-mentioned patent applications are assigned to the assignee of the present application and are herein incorporated in their entirety by reference.

BACKGROUND OF THE INVENTION

The present invention is related to the field of electric power production using combustion engines. It is further related to methods of control of electric power systems responding to load changes.

In an engine/generator system, the fuel supply to the prime mover is directly controlled by an actuator means, generally with a throttle or injection pump. Fuel supply adjustment is a method of adjusting the torque/speed characteristics of the prime mover. As the throttle is closed or the fuel injection setting reduced, the torque produced at a given rotational velocity is similarly reduced, causing the system to slow down, while wide open throttle maximizes the torque and power output at a given speed. In conventional engine/generator systems, the speed of the system is controlled by altering the torque/speed characteristic of the prime mover. This results in engine inefficiency.

An additional cause of engine inefficiency is friction. As the piston moves through the cylinder, work must be done because of friction between the piston and the cylinder. Every time the piston moves through a stroke, some energy is lost, regardless of engine power output for that piston stroke. The greater the energy output per piston stroke, the less energy lost to friction as compared to energy output.

Other sources of engine inefficiency are parasitic loads such as oil pumps and the like, which vary with engine speed, but not power output. The higher the RPM of the engine, the more energy lost to these loads, regardless of actual engine power output. Parasitic loads and cylinder friction mean that for constant power output, lower RPM will generally be more efficient.

Background Hybrid Electric Vehicles

A partial solution for inefficiency during low demand is found in systems comprising an energy storage unit (such as a battery) besides the engine-generator system. An example for such system is the Hybrid Electric Vehicle (HEV), in which the solution for the inefficient low load mode is simply to turn the engine and generator off. The power demand is supplied by the battery until a higher demand is required or until the battery reaches a low energy level. The engine and the generator are then turned on to recharge the battery and to supply power, directly or via the battery, to the vehicle.

Attempts to deal with engine inefficiency, such as with the hybrid electric vehicle have not been successful. HEVs have a problem in that involved in their usage is a substantial amount of restarting of the engine and generator, which releases fumes and is a particularly inefficient period in engine operation. Secondly, when the engine is turned off, a great amount of inertial energy is lost. This results in a waste of energy, invested in regaining the inertial energy, when the engine is restarted. Third, no currently available energy storage system is perfect; more energy must be supplied to the energy storage system than is later removed as useable electricity, with the difference being lost as heat. Energy storage systems also have limited life, in terms of number of charge/discharge cycles, and aging due to deep discharge. Even in the hybrid electric vehicle, there is substantial utility to a wide range of generator power output, providing efficiency can be maintained over this range.

Background Electrical Power Conversion

Methods for the conversion of electrical power at a given voltage, current, and frequency, to electrical power at a different voltage, current, or frequency are well known in the art. The simplest device, the transformer, is used to trade voltage for current with little loss of power to inefficiency.

Other devices convert input electrical power to an output electrical power via intermediate mechanical form, or from alternating current to alternating current of different characteristics via intermediate direct current. Power electronics are devices that usually contain transistors or similar components, and use switches to vary the electrical characteristics of their output, according to requirements. These include many variations, some of which are the bipolar transistor, the darlington pair of transistors, the field effect transistor, the pulse width modulated DC controller, the Silicon Controlled Rectifier, the DC link converter, the insulated gate bipolar transistor, the silicon controlled rectifier, the MOS controlled thyristor, as well as optically driven devices, vacuum devices, gas filled devices, and even mechanical devices. Power electronic devices can often act as variable pseudo-resistance, that is they can create voltage/current output relationships without dissipating power in the fashion of an actual resistor. The Silicon Controlled Rectifier can control how much AC power is delivered to a load.

Background Electric Generators' Control Apparatus

Electric control systems for generators are well known in the field of the art. Output of a desired frequency, voltage and current can either be achieved by controlling the operational state of the generator, or by converting the native output power of the generator to the desired voltage, frequency, current, or otherwise characterized output power.

Output characteristics of a generator are not independent, and are related by load considerations and generator internal characteristics. For example, a DC generator feeding a resistive load, when under circumstances that increase the output voltage of the generator, will also experience an increase in current flow. Often various changes in output are described with other output aspects held constant.

Engine-Generator Systems and Power Equilibrium

Engine-generator systems, in which an engine is directly mechanically linked to a generator, and providing the generator with power in the forms of torque and speed, turn at a fixed speed relation. Torque supplied by the engine is not necessarily equal to the torque absorbed by the generator. If, due to some perturbation, the generator is unable to absorb all the torque that the prime mover provides, a potentially dangerous situation may arise, for the system is not operating in equilibrium. Usually, it is the speed of the engine, and with it, the speed of the generator, which will change when the system is not operating in equilibrium, and in the case mentioned above, the speed of the system will probably increase. Sometimes the fixed mechanical linkage between the engine and generator includes some sort of gearing or mechanical advantage. In this case, then when the system is operating in equilibrium, there will be an equilibrium between the individual linkages between motor and gearing mechanism, and between gearing mechanism and generator.

The term "torque load", in the course of this specification, is used to mean the amount of torque which the generator absorbs from the engine or other prime mover, to which it is connected. It is also described as the torque in the direction counter to rotation that the generator applies to a transmission with the prime mover. A negative torque load would refer to a torque in the direction of rotation (i.e. the generator acting as a motor). The "torque of the generator" refers to the torque applied by the generator to the prime mover, in the direction of, or counter to, rotation. The prime mover in most cases may be an engine, but the term engine is used in the course of this specification to also refer to other prime movers which behave similarly to engines, with the characteristics which will be henceforth described.

An example of how torque equilibrium, or lack thereof, can affect speed, is shown in starting an engine-induction generator system, in which the induction generator is supplying electricity to a fixed frequency, fixed voltage, electrical load. When an engine-generator system is started, the speeds of the engine and generator are in fixed relation to each other, but the torques of the individual parts of the system are not. The engine is producing a torque in the direction of rotation, and for equilibrium, the generator would have to be producing an equal torque in the direction counter to rotation. However, since the speed is so low, the generator does not yet generate electricity. In fact, due to the low speeds, the generator absorbs electricity (from another power source) and produces torque in the same direction as rotation. Therefore, the torque produced by the engine is not absorbed by the generator, resulting in system speed acceleration. However, as high enough speeds are reached, the generator begins to generate electricity, and to absorb the torque produced by the engine. There is (in a matched system) at least one equilibrium point, at which the torque output of the engine matches the torque absorbed by the generator, whereupon the system ceases acceleration, and a steady speed is maintained. When changes in system output are required, these are usually made by throttling the engine, or similar methods. Throttling acts to change the torque/speed characteristics of the engine. When throttling is used, the system will often change speed to a different torque equilibrium point, due to the new engine characteristics.

In all examples of engine-generator systems, each of the engine and the generator will have a characteristic that describes how its torque changes with speed. These characteristics will determine the equilibrium speed of the combined engine/generator system.

The generator torque/speed characteristics will depend upon the type of generator it is, its level of excitation, and the load to which it is supplying electricity. Induction generators, when attached to electrical loads having fixed voltage, fixed frequency characteristics, are known to be quite stable, being that within the speed range at which they generate electricity, they have a steep torque requirement relative to their speed requirement. Thus an accidental speed change in a system involving an induction generator will be immediately followed by a large torque change, which normally causes the system to return to equilibrium speed.

Note that in the pathological condition of the engine providing greater torque output than the maximum torque load of the generator, system speed will continue to increase until the internal friction of the engine prevents further speed increase, or until the system fails. This is known as a runaway condition. The maximum torque of an induction generator is limited by the load current. A sudden reduction in load will reduce the maximum torque load of the induction generator, and may cause a runaway condition.

In AC induction machines a method may be applied for the alternation between generator and motor modes. The synchronous speed, the speed of the rotating magnetic field, of the induction machine is determined by the number of poles of the machine and the frequency of the applied AC power. The synchronous speed is given by the formula: Ns=120 f/P where: Ns is the Synchronous speed in rotations per minute; f is the frequency of the power supply in cycles per second; and P is the number of poles for which the machine is wound.

In induction generators the actual speed of the rotor is faster than the synchronous speed of the rotating field. In induction motors the actual speed of the rotor is lower than the synchronous speed of the rotating field. In fact, the motor and the generator are essentially the same machine with the main difference being in their actual speed in relation to their synchronous speed; induction machines that are marketed as motors are often placed into service as generators. Although a generator is supplying real electrical power to a load, it is consuming reactive power for excitation purposes. If an induction machine does not have a source of excitation power, then it will not develop a rotating magnetic field, and will not act as a generator.

By controlling the frequency of the input power to the excitation, a controller may increase or decrease the synchronous speed of the machine. For a given rotor RPM, the control may increase or decrease the synchronous speed to be faster or slower than the rotor RPM thereby determining the function of the induction machine as a generator or a motor.

U.S. Pat. No. 6,054,844 granted to Frank describes a system in which the torque applied by a motor/generator to the engine is calculated and applied to force the engine torque to have an ideal relationship to the calculated engine speed. Frank's methods of controlling the engine involve calculations and lookup tables as to how much torque the motor must force the engine to adopt so that the speed/torque relationship of the engine follows an ideal operating line. Another point Frank describes is how the engine is switched off if its speed is too low as to have non-ideal conditions. Furthermore, Frank's system is described only with reference to vehicles, and does not include other applications of engine-generator sets. Whilst the Frank apparatus controls engine power output via the torque/speed curve reflected from the wheels, with corrections for CVT dynamics terms, a need remains for a system which controls engine power output in a fashion which is independent of wheel loads.

BRIEF SUMMARY OF THE INVENTION

The present invention comprises a generator driven by, and connected to, a prime mover, typically a heat engine. The generator is connected to a load and to an electronic control system.

The present invention controls fuel consumption, power output and heat engine operation, by electronic control of the torque/speed characteristics of the generator. This electronic control of torque/speed characteristics is obtained either by direct control of generator excitation, or by indirect control of the voltage/current or frequency characteristic of the load. Control of the system by electronic control of the generator allows for heat engine operation in a wide open throttle condition, while being able to operate over a large speed range. The quantity of fuel consumed per piston stroke is maximized, and the energy output per piston stroke remains essentially constant. Power output of the engine/generator system is regulated by controlling the number of piston strokes per second. In general, feedback does not directly control engine speed, but instead power output.

In a further embodiment of the present invention, a throttle or fuel metering is used to maintain the charge of fuel and air in the cylinder at a predetermined maximum level. For maximum efficiency, a throttle operated near the wide open condition may be used. Such a throttle may also find use as an emergency shutdown device, in the event of an electrical failure. As used in the method of the present invention, such a throttle does not take part in the primary control of engine operation.

A further embodiment of the present invention is to dynamically control the torque/speed characteristics of the generator in synchronism with the cyclic torque changes of the power output of the heat engine. The generator may act as a motor for part of the heat engine cycle, powering the heat engine during power absorbing strokes of the cycle. This facilitates the use of single cylinder engines, and engines without flywheels.

Objects of the present invention are, therefore, to provide new and improved methods and apparatus for prime mover-generator systems and control over them, having one or more of the following capabilities, features, and/or characteristics:

A technical advantage of the present invention is that it provides new and improved methods and apparatus for prime mover generator systems and control over them. A further technical advantages is to provide a heat engine generator system in which the heat engine can be continuously operated over a wide load range without induction restriction, avoiding the need for engine throttling.

Another technical advantage of the present invention is that higher engine efficiency is obtained by avoiding engine operation in a near closed throttle mode. Further, the heat engine does not have to be turned on and off in response to demand, but rather the engine runs steadily. This avoids the fumes and pollution caused when a heat engine starts and prevents the loss of rotational energy that occurs from repeated stopping and starting.

A further technical advantage of the present invention is that it provides a heat engine generator system in which control is applied to the generator to electronically regulate the output of the system. Thus, control over the output of the system may be faster and more exact. Further, the load on the heat engine may be electrically manipulated to maintain a close to optimal run of the engine.

A still further technical advantage of the present invention is that it provides a method by which a generator may be operated periodically as a motor. This allows the heat engine operation, during power absorbing strokes, to be improved by a periodic transfer of power from the generator, acting as motor, back to the engine. Thus, the present invention provides a simple method by which an electrical machine may alternate between generator and motor operation without direct control intervention, and without need to synchronize controller operation to heat engine operation.

Other technical advantages of the present invention are set forth in or will be apparent from drawings and the description of the invention that follows, or may be learned from the practice of the invention.

BRIEF DESCRIPTION OF THE SEVERAL VIEWS OF THE DRAWING

For a more complete explanation of the present invention and the technical advantages thereof, reference is now made to the following description and the accompanying drawings, wherein like reference numerals represent like parts, in which.

DETAILED DESCRIPTION OF THE INVENTION

Embodiments of the present invention and their technical advantages may be better understood by referring to FIGS. 1 though 9, like numerals referring to like and corresponding parts of the various drawings.

Figure 1A:
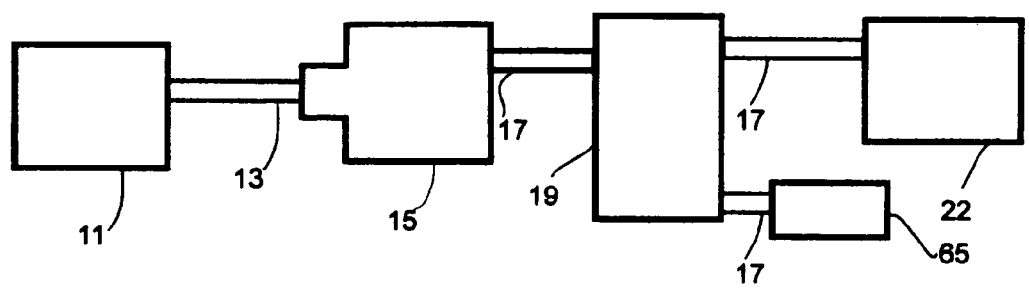
FIGS. 1a–1h illustrate various embodiments of the present invention.

FIG. 1a shows a schematic overview of the present invention. Prime mover 11 is connected to an electric generator 15 via shaft 13. Generator 15 is connected to control mechanism 19, which may take the form of a power electronic load, as described in Example 3, below, via wiring 17. Control mechanism 19 is further electrically connected to an electrical load 22. The control mechanism 19 has an input 65. The generator 15 may be a direct current generator (hereafter, DC), or an alternating current generator (hereafter, AC), as described in the embodiments below, and with reference to the descriptions of various types of generators in the background section above. In the case that the generator 15 is an AC generator, a rectifier 67 may be required between the generator 15 and the control mechanism 19.

Figure 1B:
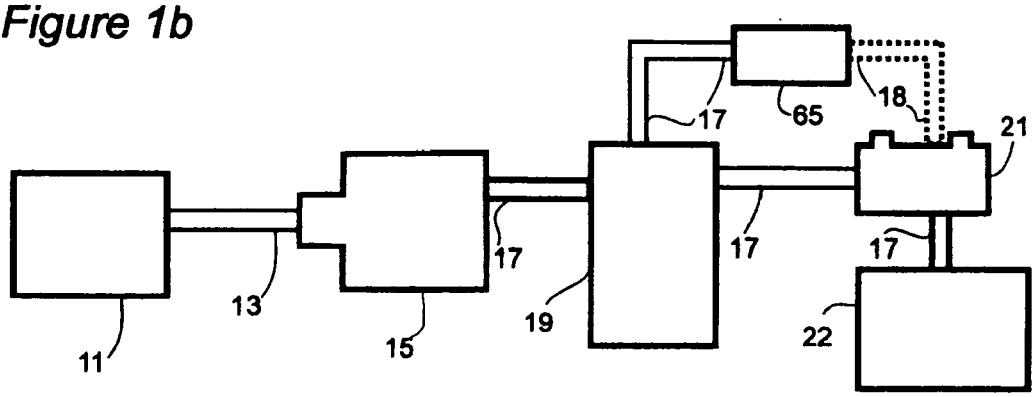

FIG. 1b shows another embodiment of the present invention, comprising a prime mover 11, connected by a shaft 13 to a generator 15. The generator is electrically connected to an energy storage unit 21, and to an electrical load 22. The electrical characteristics of the output of the generator 15 are controlled by control mechanism 19. The control mechanism includes an input 65, which may in some embodiments include signals received from energy storage unit 21, to describe depth, or rate of discharge. Dotted lines 18 represent these signals from said energy storage.

Control mechanism 19 in these figures may contain one or more of several different control features, as described below. It may include variable resistance, or pseudo-resistance, as in a power electronic load, described below. Input 65 in some embodiments may be incorporated into control mechanism 19. To determine the electrical characteristics of the generator 15, required to achieve a required power output, the control mechanism 19 may contain graphical or mathematical techniques. These latter components are well known in the art, and are not shown specifically on the Figure.

Figure 1C:
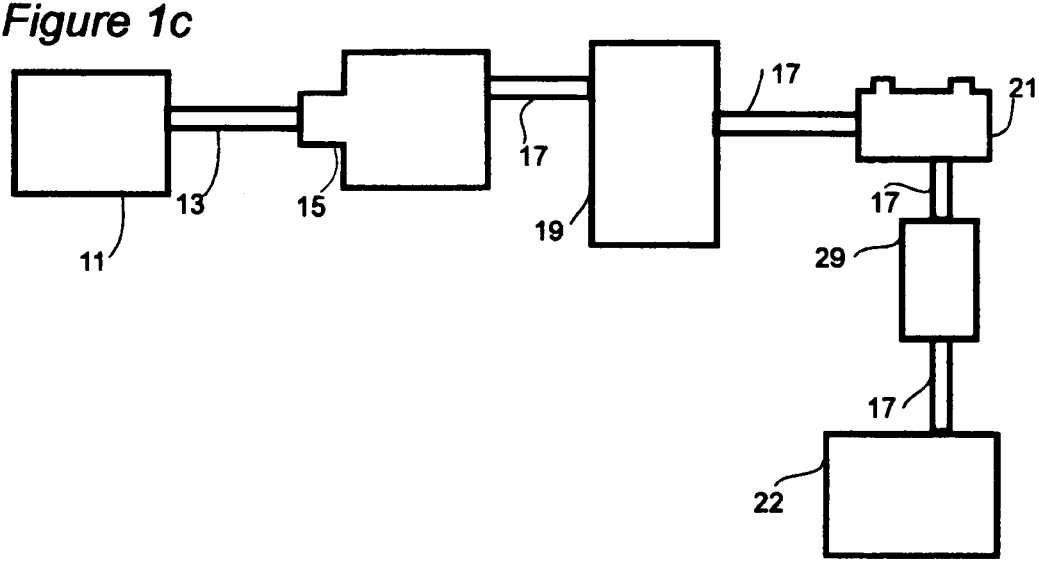

FIG. 1c shows a similar embodiment to FIG. 1b, with the addition of controller 29 electrically connected between the energy storage unit 21 and the electrical load 22. The controller 29 is for supplying power to the electrical load 22 at substantially the electrical requirements of said electrical load 22.

Figure 1D:
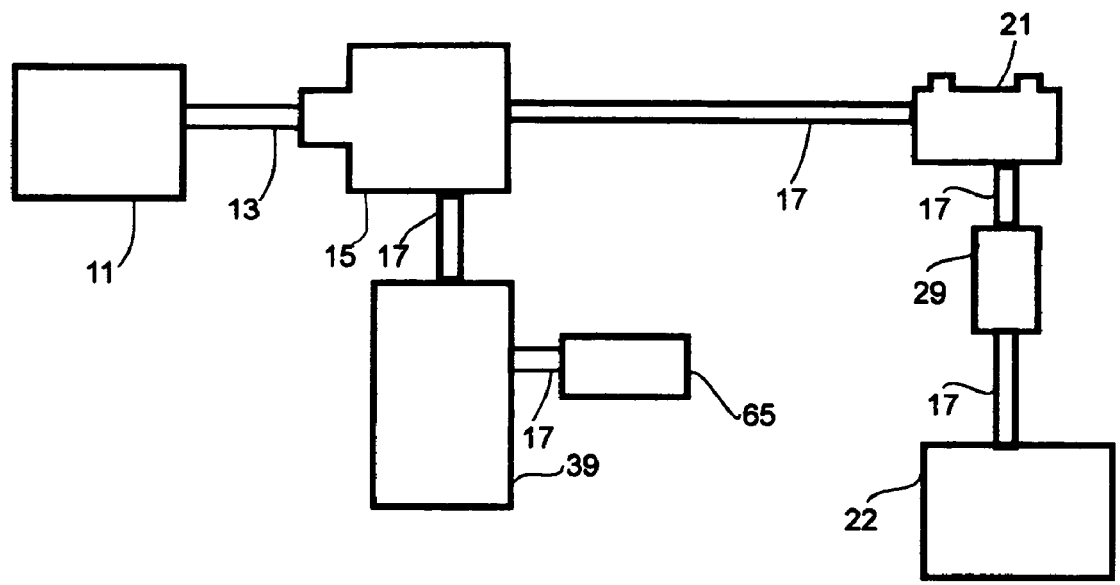

FIG. 1d shows a different embodiment of the present invention. An engine 11 is connected via a shaft to a direct current (DC) generator 15. The excitation of the DC generator is controlled by generator excitation controller 39. The generator is connected with electrical connecting wiring 17 to an energy storage unit 21. The energy storage unit 21 is connected to an electrical load 22, with a controller 29 electrically connected between them load for supplying power to the electrical load 22 at substantially the electrical requirements of the electrical load 22. In related embodiments, the generator is an AC generator with adjustable excitation, in which case a rectifier 67 would need to be added electrically between the generator 15 and the energy storage unit 21.

Figure 1E:
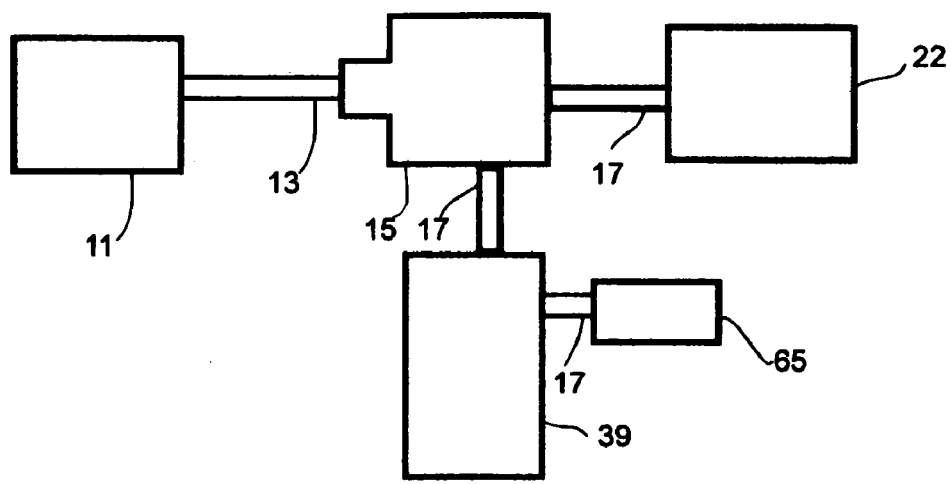

FIG. 1e represents a simpler embodiment, similar to FIG. 1d, in which the energy storage unit 21 is omitted. An engine supplies mechanical power output to a generator, via a shaft 13. The excitation of the generator 15 is controlled by generator excitation controller 39, which adjusts the excitation of the generator 15 to control the torque load that the generator 15 applies to the shaft 13, and thereby control acceleration or deceleration of the engine. The electrical load 22, connected to the electrical output of the generator 15, receives electrical current from the generator 15, at basically required power outputs as determined by the generator excitation controller 39, but also including power fluctuations caused during changes in power output requirements.

Figure 1F:
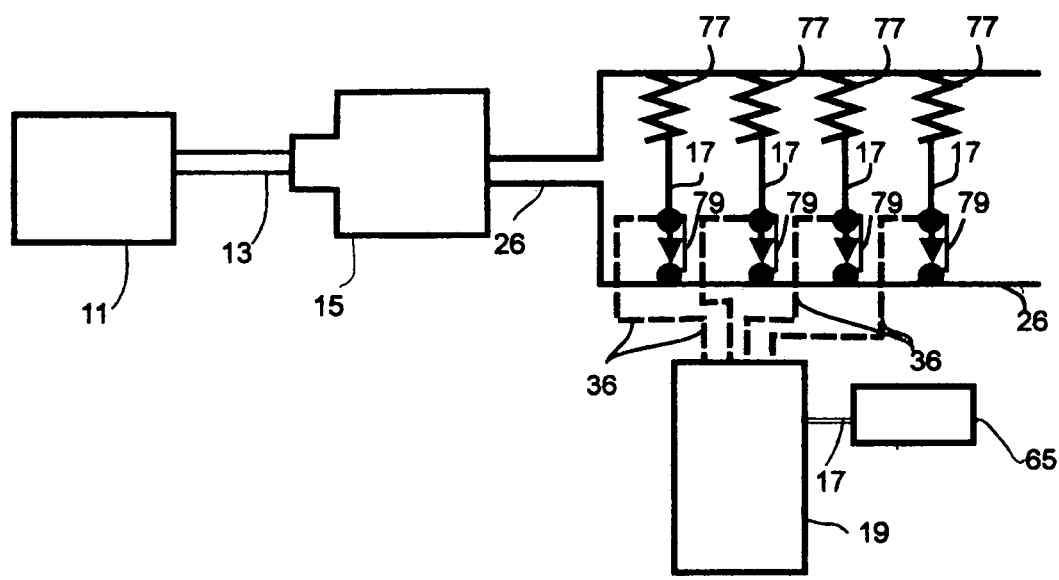

FIG. 1f shows an embodiment of the present invention, in which the load is made of a set of resistive loads. The generator output circuit 26 includes a choice of a few resistive loads 77, connected by switches 79 into the generator output circuit 26. The switches 79 are operated by a control mechanism 19, as seen by the actuator 36.

Figure 1G:
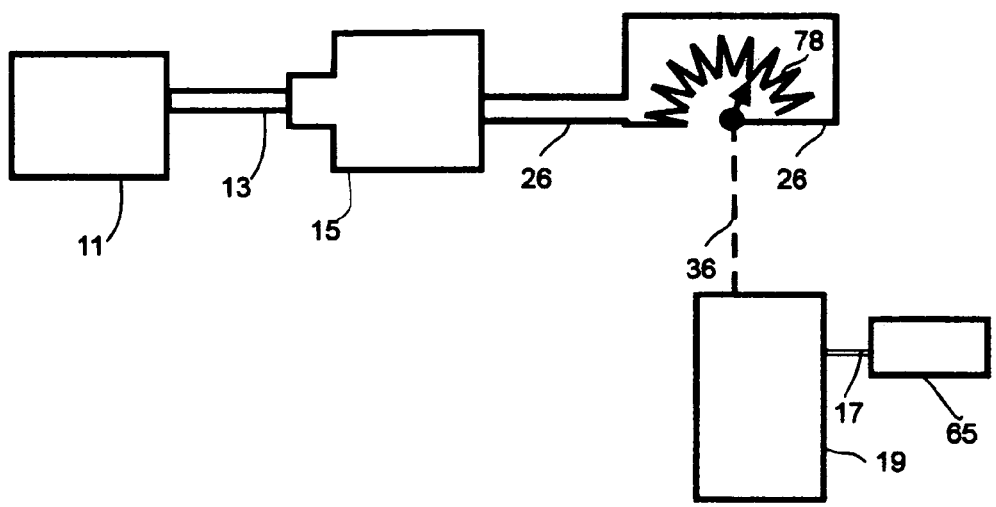

FIG. 1g shows generator output circuit 26 across which a variable resistor 78 has been connected. It is operated by control mechanism 19, as seen by actuator 36. The control mechanism 19 includes an input 65. A further electrical load 22 may also connected to the generator output circuit 26.

FIGS. 1f and 1g are described in detail in the section "Example 1—Changing a Resistive Load on a Generator".

Figure 3:
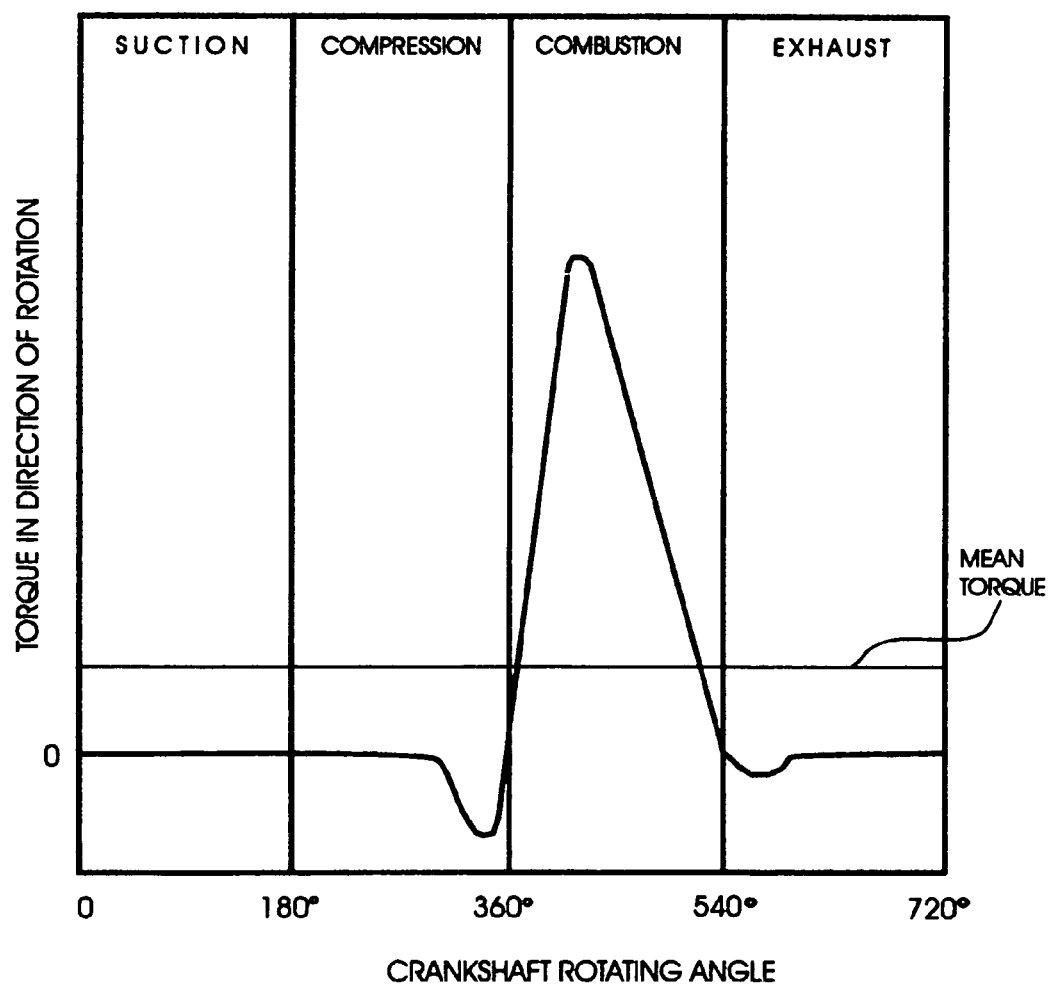
FIG. 3 is a graph of engine and generator torques in one embodiment of the present invention.

FIG. 3 is a graph of the engine and generator torques in one embodiment of the present invention. The engine is a single cylinder diesel engine coupled to an appropriately sized induction generator. The horizontal axis of the graph is time, while the vertical axis of the graph is torque in the direction of rotation. The horizontal axis is divided amongst the four strokes of the engine.

Figure 4:
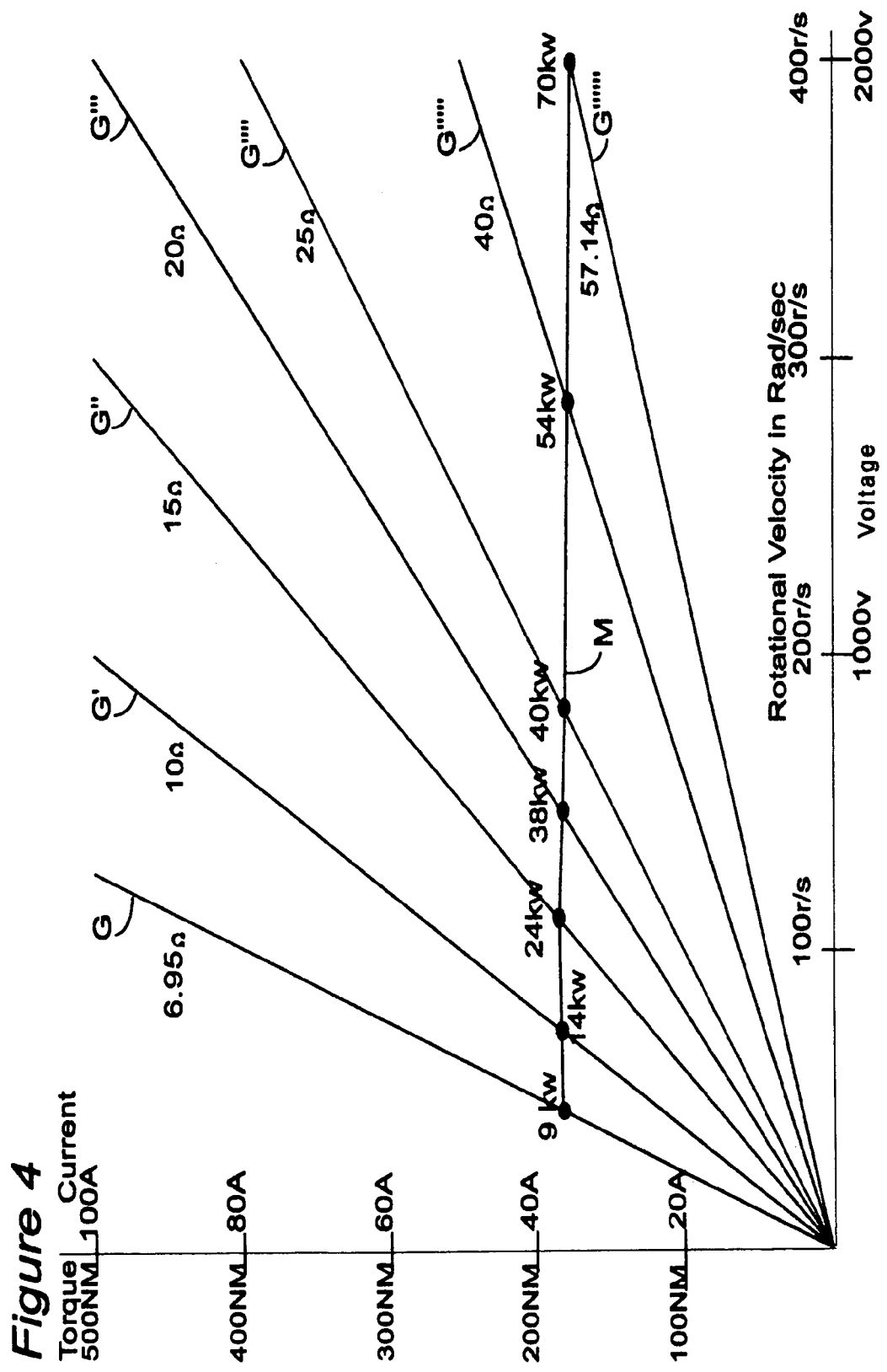
FIG. 4 is a torque/speed diagram for an internal combustion engine and a DC generator coupled to a set of resistive loads.

FIG. 4 is a torque/speed diagram for an internal combustion engine and a DC generator coupled to a set of resistive loads. Curve M represents the torque/speed characteristic of this example engine, with the horizontal axis representing rotational velocity, and the vertical axis representing torque in the direction of rotation. Curves G, G', G'', G''', . . . , G'''''' represent the torque/speed characteristics of the example DC generator under various load resistance conditions, with the horizontal axis again representing rotational velocity, but with the vertical axis representing torque in the direction counter to rotation.

Figure 5:
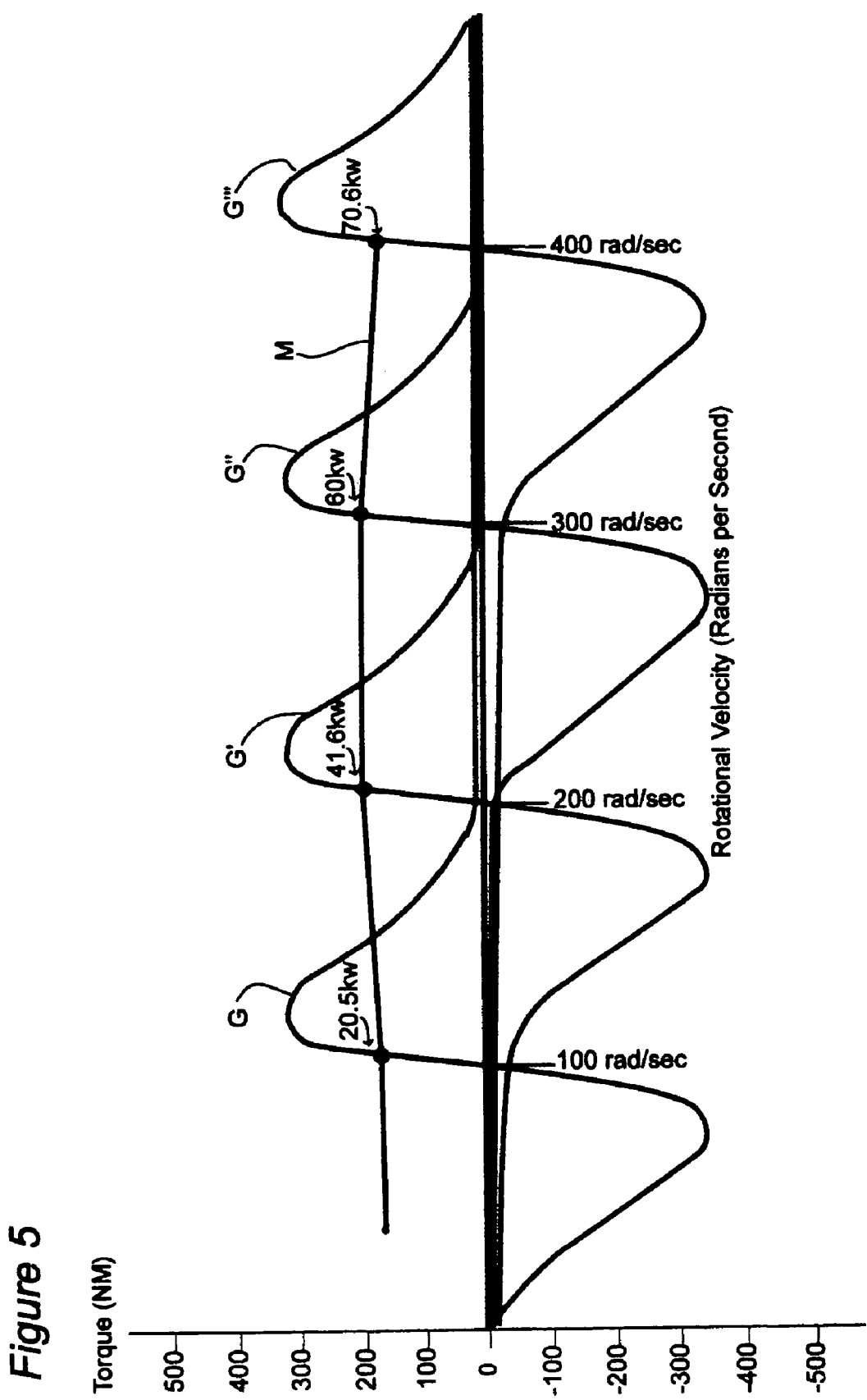
FIG. 5 is a torque/speed diagram for an internal combustion engine and an AC induction generator coupled to a power electronic control.

FIG. 5 is a torque/speed diagram for an internal combustion engine and an AC induction generator coupled to a power electronic control. Curve M represents the torque/speed characteristic of an example engine, with the horizontal axis representing rotational velocity, and the vertical axis representing torque in the direction of rotation. Curves G, G', G'', . . . , G'''''' represent the torque/speed characteristics of the example AC generator operating at various drive frequencies and a constant voltage/frequency ratio. The power electronic drive is designed to maintain proper voltage while both sourcing and sinking power.

Figure 6:
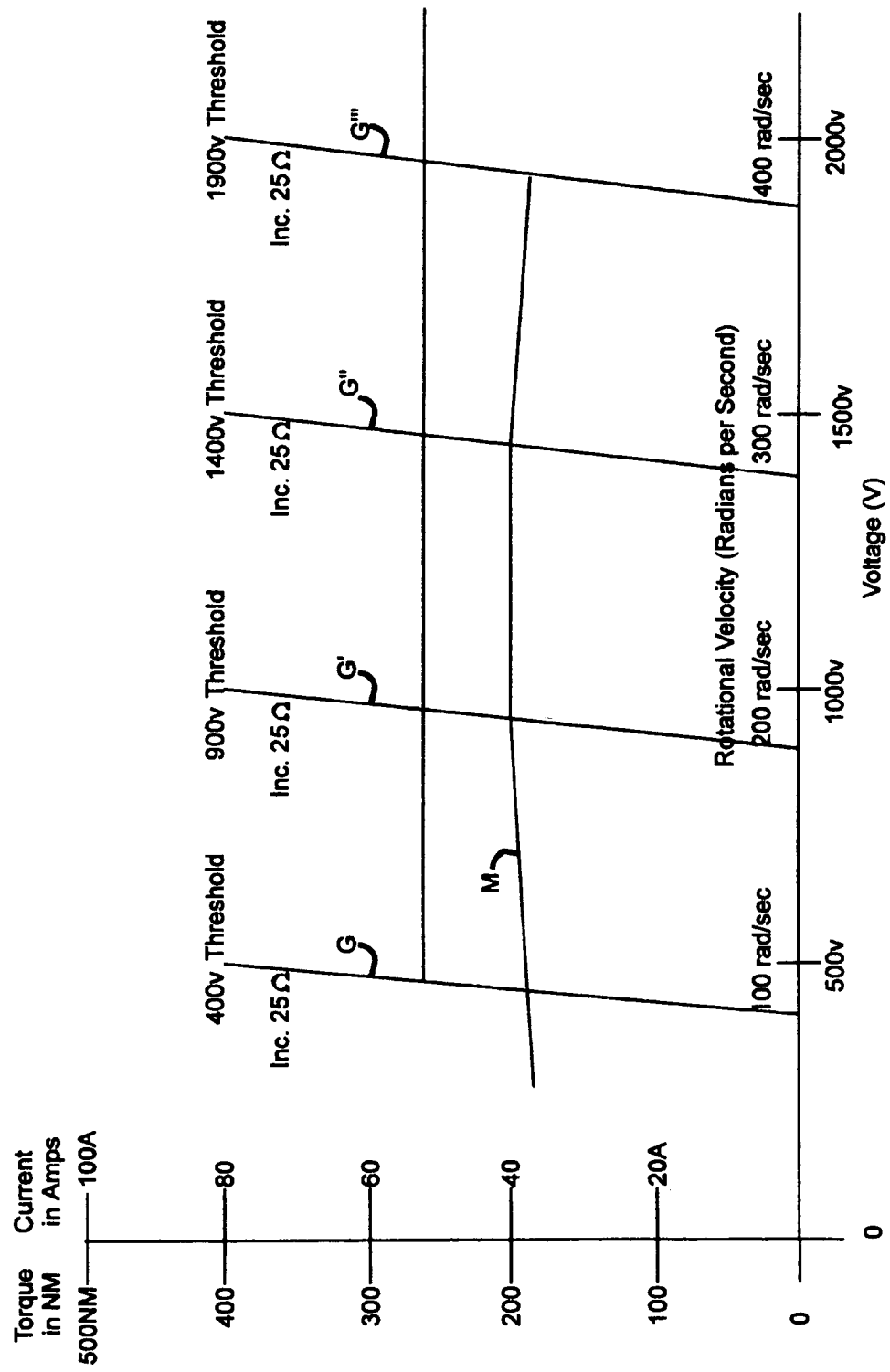
FIG. 6 is a torque/speed diagram for an internal combustion engine and a DC generator coupled to a power electronic load accepting current at various threshold voltages.

FIG. 6 is a torque/speed diagram for an internal combustion engine and a DC generator coupled to a power electronic load accepting current at various threshold voltages. Curve M represents the torque/speed characteristic of an example engine, with the horizontal axis representing rotational velocity, and the vertical axis representing torque in the direction of rotation. Curves G, G', G'', G''', . . . , G'''''' represent the torque/speed characteristics of the example DC generator under various load conditions, with the vertical axis representing torque in the direction counter to rotation. The load in this case is designed to have little current flow until a programmed threshold voltage, followed by increasing current flow at an incremental resistance of 2.5 ohms, meaning that for every 10 volts above the threshold voltage, current increases by 4 amps.

Figure 7:
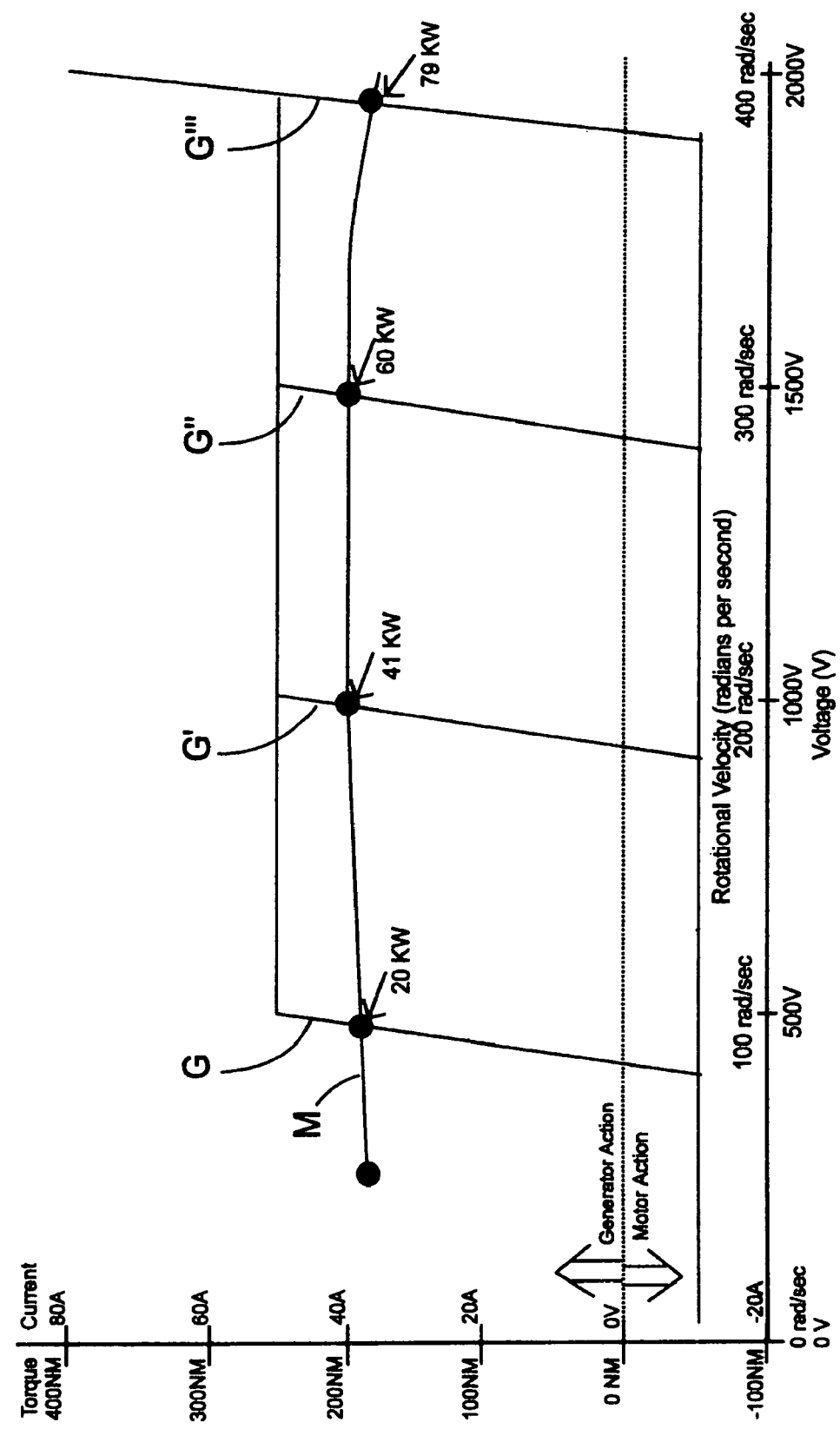
FIG. 7 is a torque/speed diagram for an internal combustion engine and a DC generator coupled to a power electronic load accepting current at various threshold voltages, with sourcing current.

FIG. 7 is a torque/speed diagram for an internal combustion engine and a DC generator coupled to a power electronic load accepting current at various threshold voltages, with the additional capability of sourcing current. Curve M represents the torque/speed characteristic of an example engine, with the horizontal axis representing rotational velocity, and the vertical axis representing torque in the direction of rotation. Curves G, G'', G''', . . . , G'''''' represent the torque/speed characteristics of the example DC generator under various load conditions, with the vertical axis representing torque in the direction counter to rotation. The load in this case is designed to source current to the generator until a programmed threshold voltage, followed by increasing current flow at an incremental resistance of 2.5 ohms, meaning that for every 10 volts above the threshold voltage, current consumption increases by 4 amps. The generator will operate as a motor until it reaches a rotational velocity set by the threshold voltage, at which point it will begin to source power to the load.

Figure 8A:
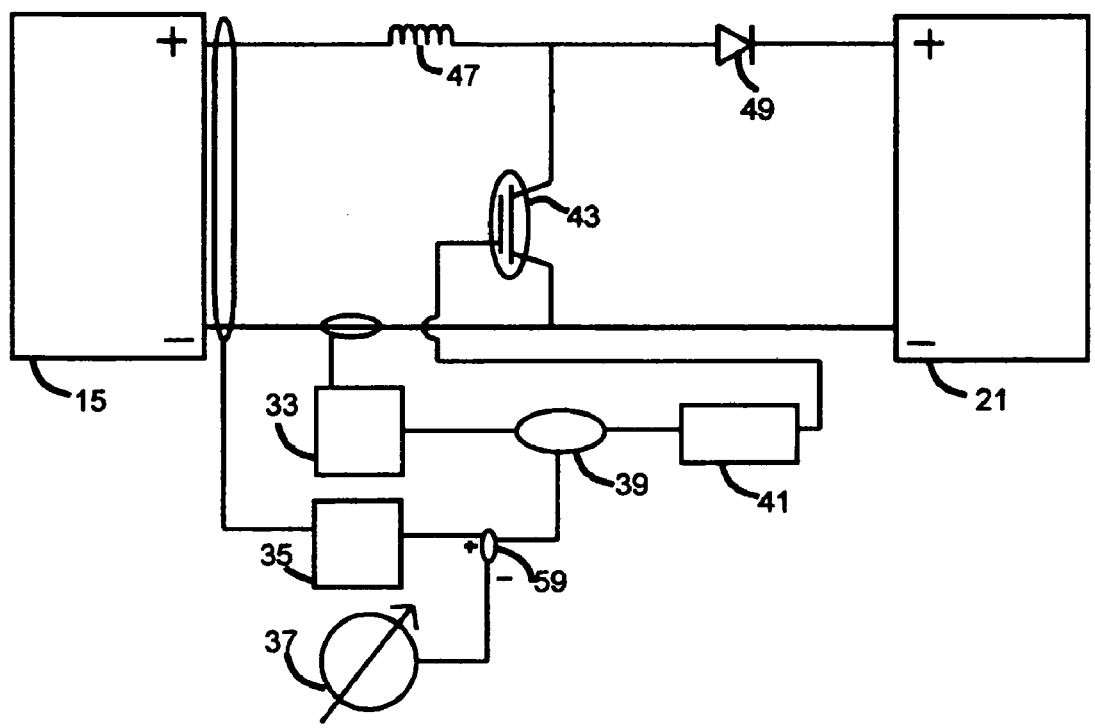
FIG. 8A is a representation of a boost converter with feedback drawn from the input.
Figure 8B:
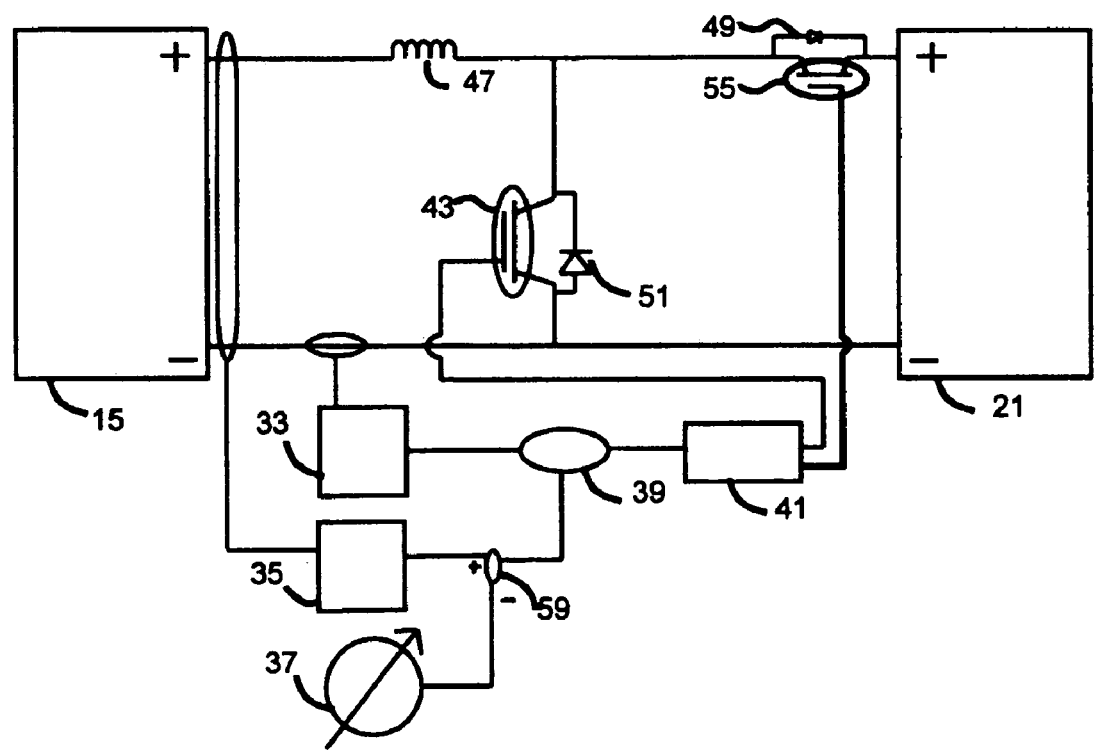
FIG. 8B is a representation of a boost converter load combined with a buck converter power supply.

FIG. 8 are schematic diagrams of power electronic loads. FIG. 8A is a representation of a boost converter with feedback drawn from the input. FIG. 8B is a representation of a boost converter load combined with buck converter power supply to cause the generator to act as a motor at low voltage levels.

Figure 9A:
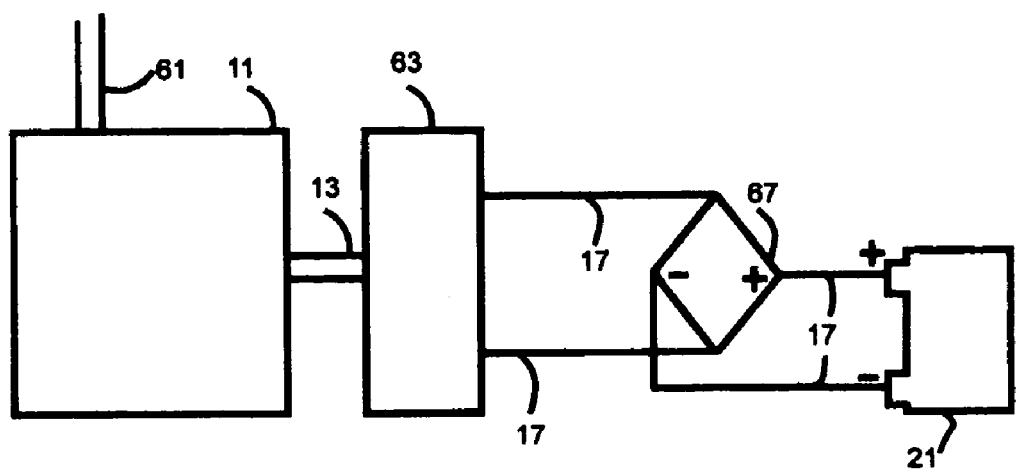
FIG. 9A is an arrangement of an internal combustion engine and an alternator.
Figure 9B:
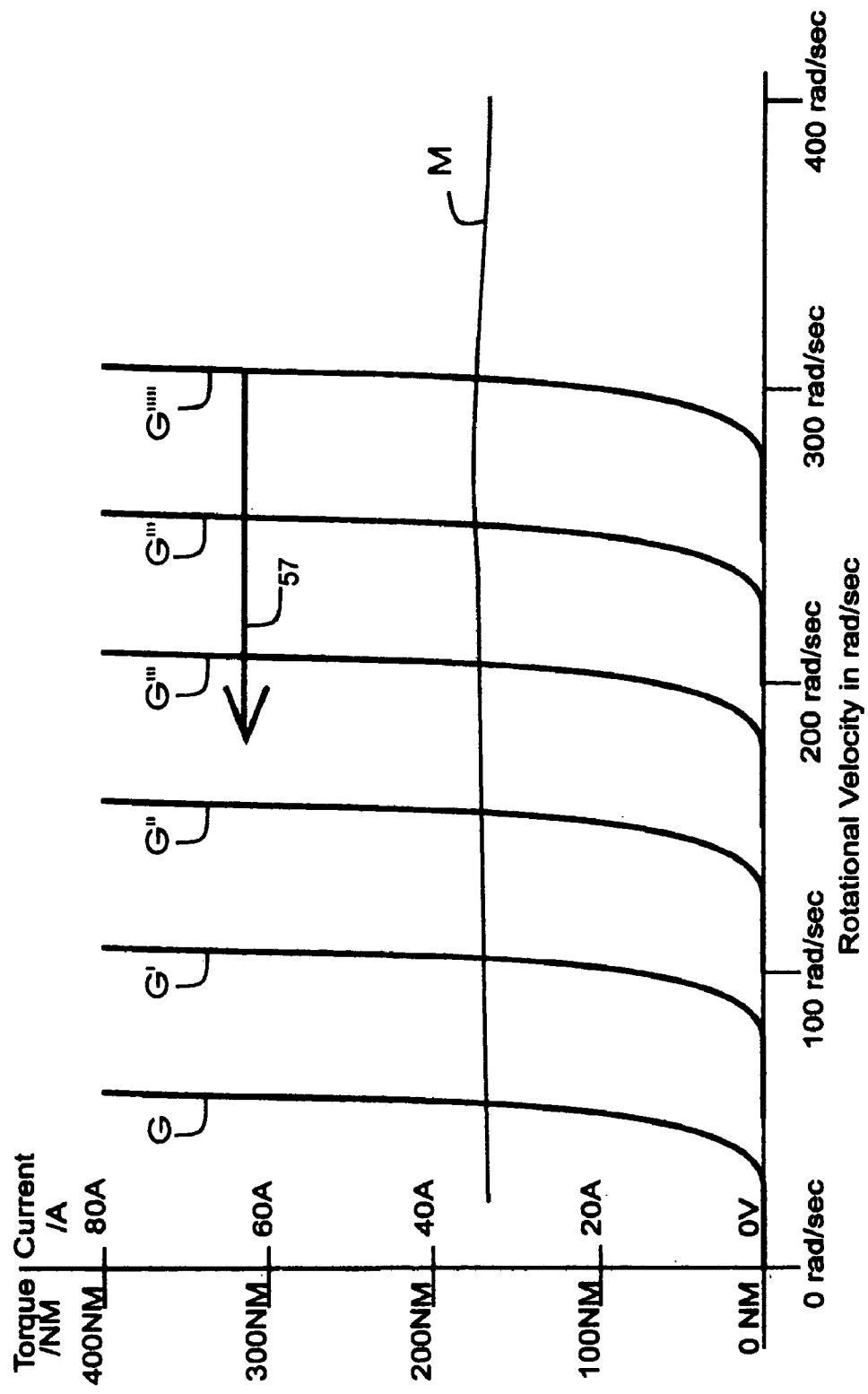
FIG. 9B is a torque/speed diagram for an internal combustion engine and an alternator supplying power to a battery.
Figure 9C:
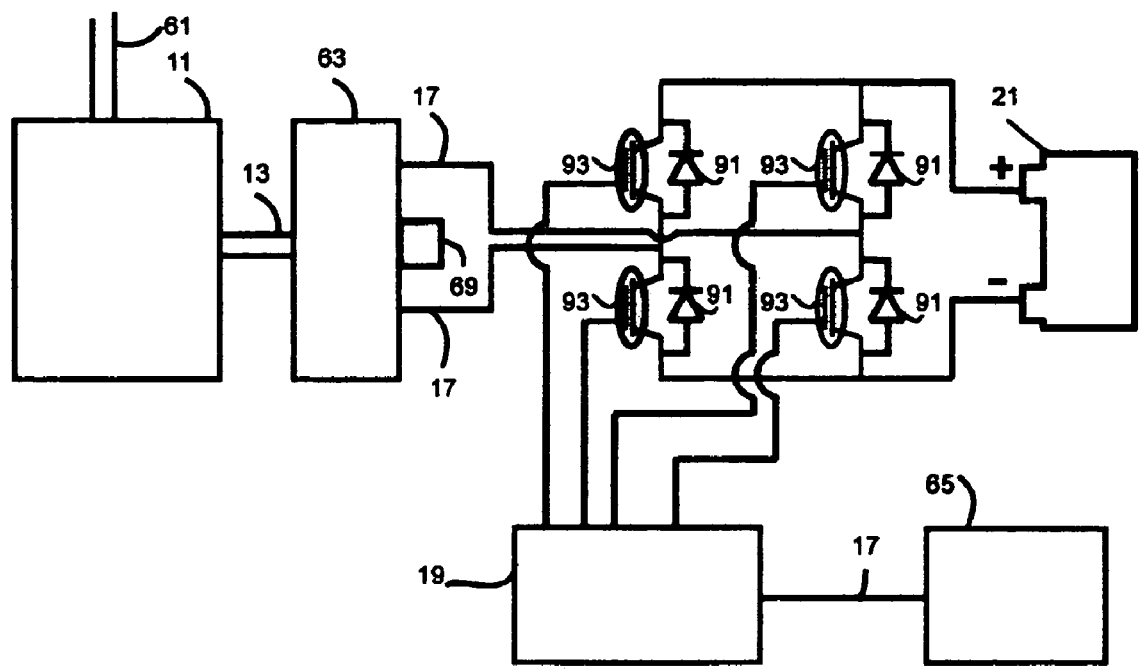
FIG. 9C is an arrangement of an internal combustion engine and an alternator in one embodiment of the method of the present invention.

FIG. 9 are schematic diagrams of the use of an automotive alternator in the method of the present invention. FIG. 9A represents an alternator in its prior art usage. FIG. 9C is the arrangement of the alternator in the method of the present invention. FIG. 9B is a torque/speed diagram for an internal combustion engine and an alternator supplying power to a battery. The alternator has adjustable excitation. Curve M represents the torque/speed characteristic of an example engine, with the horizontal axis representing rotational velocity, and the vertical axis representing torque in the direction of rotation. Curves G, G', G", . . . , G"''' represent the torque/speed characteristics of the example alternator under various excitation conditions, with the vertical axis representing torque in the direction counter to rotation. In this case, the load is simply a battery. Current through the alternator rectifier is essentially zero until the alternator voltage matches battery voltage, at which point current and torque begins to rise rapidly. Alternator voltage may be adjusted by adjusting excitation.

In the method of the present invention, the power output of the heat engine/generator system is controlled by electrical manipulation of the torque/speed characteristics of the generator. The present invention comprises a heat engine, an electric generator, and a power electronic control. Electrical energy storage, in addition to suitable control means for the same, may additionally be used. A load consumes the electrical power produced. To facilitate understanding, the common diesel engine rotating an induction generator system will be used to describe a particular embodiment of the present invention. The present invention may be used with all common internal combustion engines, including Otto cycle engines, two stroke engines, and rotary engines, as well as with other prime movers whose potential energy consumption may be controlled by the RPM of the prime mover. The common feature of diesel engines, Otto cycle engines, two stroke engines, and Wankel rotary engines is that air intake and fuel burned are directly controlled by the rotational velocity of the engine. The greater the number of engine cycles per second, the more fuel burned, and the greater the power output. Other devices, for example piston engines operated by steam pressure, share the common feature that rotational velocity determines potential energy consumed and thus, power output.

Figure 1H:
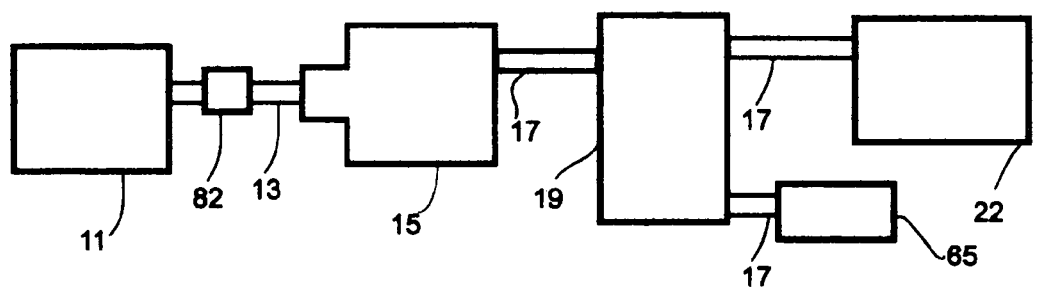

The heat engine is directly coupled to the generator, via a mechanical means, such as a shaft, or gearing or other speed changing apparatus. Gearing or other speed changing apparatus 82 is shown in FIG. 1h. The generator converts mechanical power into electrical power, and driving an output current through a load. The torque/speed relation of the generator is electronically controlled, either by direct control of generator excitation, or by control of load voltage/current or load frequency characteristics. Through control of the torque/speed characteristics of the generator, control of the system's rotational velocity is effected without the use of a throttle. The heat engine is operated at wide open throttle, with power variation being achieved through changes in rotational velocity.

To achieve variation in system power output, the speed of the engine is changed to produce the desired power output at wide open throttle condition. The speed of the generator is the same as, or related to, the speed of the prime mover to which it is connected.

In the method of the present invention, the speed of the system can be indirectly manipulated by altering the relationship between the generator's torque requirements and its speed. The engine/generator equilibrium speed is changed, and the system moves to this new speed. In general, higher engine speed means more fuel consumption and more power output, thus, control of system power output is achieved through the manipulation of generator torque/speed characteristic.

The manipulation of generator torque/speed characteristic can be done, for example, in two ways: a switching or changeable load or by changing the excitation magnitude or frequency of the generator. When using a switching or changeable load, the load can be made to draw more or less current. This will increase or decrease the torque requirements, r "torque load" of the generator.

When changing the excitation magnitude or frequency of the generator, the characteristics of the power supplied to the load is changed. In the case of AC machines, the excitation frequency sets the synchronous speed of the generator. In the case of both AC and DC machines, the excitation current sets the strength of the magnetic field in the generator, and thus, the voltage output at a particular RPM.

An AC induction generator contains stator windings which both provide output as well as excitation. The frequency and voltage of the excitation can be modified to produce a difference in the torque load of the generator. The excitation is provided by quadrature AC, that is alternating current in which the current is not in phase with the voltage. Quadrature AC in the stator windings induces current in the rotor windings, and the current in the rotor windings generates the magnetic field. The induction machine excitation can be controlled through the use of power electronics. They can arbitrarily draw current out of phase with the voltage, and can thereby adjust the quadrature current flowing in an induction machine. The power electronic may comprise an inverter, such as is used to operate induction motors in variable speed applications. The use of the inverter allows for direct control of synchronous speed, and thus, control of the equilibrium point between heat engine torque and generator load. The power electronics can also change the voltage that the system is operating at, which will change the excitation current levels. Power electronics can also control the total current drawn, and in this fashion can also adjust machine torque and power output.

Similarly, for the synchronous generator, synchronous speed is frequency controlled. A synchronous generator works in the following manner. In the synchronous machine, the stator poles are magnetized with a rotating magnetic field. The north stator pole is magnetically attracted to the south rotor pole, and the south stator pole is attracted to the north rotor pole. In generator action the north and south poles of the rotor are slightly ahead of their stator opposites and pull them along. Unlike induction machines, the synchronous machine's rotating magnetic field is rotating at the same velocity as the rotor, which is known as the synchronous speed. However, there is ability for control over the torque load of the generator, in the angular difference between the equivalent poles of the rotor and stator. This angular difference is directly related to the torque load of the generator on the prime mover.

Control of AC synchronous machines may thereby be achieved through the control of the frequency and voltage applied to the terminals of the machine. The applied frequency can differ only slightly from the actual rotational velocity of the rotor, or the machine will fall out of synchronism. Slight changes in drive frequency will cause the rotor to speed up or slow down in order to return to synchronism. The rotor poles would then, after that brief moment of change, although being in synchronism with the stator poles, be slightly more ahead of, or slightly closer to, their stator equivalents. In this state the generator would be applying a different torque load on the prime mover. Making controlled changes in drive frequency and/or drive voltage may be used in the method of the present invention to actively control the torque load, and thereby the speed and total power output of the prime mover.

The output of the synchronous generator may also be converted, using suitable apparatus, for example an AC input switching power supply may be used to increase the current drawn by the load, again increasing power output and torque load upon the prime mover.

In the case of the DC generator, generator torque load is nearly linear in output current level. Thus, one may dynamically adjust the torque load by changing load resistance, for example, through the use of a DC—DC converter. Generator torque load is also nearly linear with field excitation, thus, generator torque load may be controlled by adjustment of the field, if a suitable load is being supplied.

An AC synchronous generator with a wound rotor, driving a DC load through suitable rectification means, will operate similarly to a DC generator, as described above, and with similar control capabilities.

As stated above, the speed of the engine/generator system is set by torque equilibrium. If, when the system is in equilibrium at a particular speed with a particular torque equilibrium, the torque/speed characteristic of the generator is changed, then for that particular speed the generator will now have a different torque. The torques of the system will no longer be in equilibrium and the speed of the engine will usually change. When the speed of the engine changes, the speed of the generator changes too. The engine/generator system will speed up or slow down depending upon the net total torque between engine and generator.

In the case of a heat engine coupled to an induction generator supplying a constant voltage load, a slight reduction in the excitation frequency will lower system synchronous speed. As the generator's slip has now increased, its torque load will be greater. This will cause the system to slow down. An increase in synchronous speed will decrease the torque load of the generator, and cause the system to speed up. Note that the power electronic controller may be required to source or sink additional drive power during these speed changes, and that the extent of the speed changes will be limited by the maxima of the torque speed characteristics of the generator. If drive frequency is changed such that the generator is operating well above synchronous speed, then the torque maximum may be passed and torque may be reduced.

In the case of a heat engine coupled to a DC generator, a slight reduction in the excitation current will decrease the voltage output of the generator. Presuming a resistive load, this will reduce the current being driven through the load. The torque requirements of the generator are thereby reduced and the equilibrium speed will be at a higher level. The engine/generator system will speed up. An increase in field excitation will increase the voltage and current, and hence the torque load of the generator and cause the system to slow down. The excitation field is often produced by an electromagnet, allowing the field excitation to be electronically controlled.

The power output changes need not preceded by a closing or opening of a throttle. The imbalance between the torque output of the engine and the torque load of the generator, caused by changes in the electrical characteristics of the generator, changes the speed of the engine. It is the change in engine speed that causes the fuel draw of the engine to change.

It should be noted that a change in power requirements does not mean that the power requirement is immediately met by the power output of the generator. In order to reduce the power output of the system, the system speed is reduced. But in order to reduce system speed, the torque load of the generator is increased, in order to cause the RPM change. Power is given by the product of torque and rotational velocity. Thus, the torque has increased, but rotational velocity has not had time to change. To slow the system down in response to a reduction in load, for a moment the power output is increased. Likewise, in response to a required increase in load, for a moment the power output is decreased. Changes are arranged by altering the net torque of the system with the goal of modifying the RPM of the engine, and thereby changing the power output of the system.

The above torque equilibrium may be supplemented and further clarified by consideration of power equilibrium.

In order to maintain and control the speed and power output of the engine while keeping its throttle at the wide open state, the following control procedure may be used:

(1) If the engine is rotating too fast and therefore consuming too much fuel and producing too much power, then more torque is absorbed by the generator and the load, slowing down the engine, or (2) if the engine is rotating too slowly, then less torque is absorbed by the generator and the load, causing the engine to speed up.

This control procedure may be understood in terms of the torque balance description presented above. Rotational power is given by the product of torque and rotational velocity. As the engine and generator are locked together in terms of rotational velocity, the only variable is the torque. If the engine torque is greater than the torque being absorbed by the generator, then the engine power will be greater than the power being absorbed by the generator, and the system will speed up. If the engine torque is less than the torque being absorbed by the generator, then the engine power will be less than the power being absorbed by the generator, and the system will slow down.

A throttle not being intrinsic to the present invention, it nevertheless may play a role in such systems. For example, it may be used for emergency overall control, for shutdown, or for very speedy changes, with the method of the present invention used afterwards to achieve a more efficient engine performance, or a throttle may be used to put limits on the amount of fuel the engine may speed up to, for example, when the control over the current being automatic and subject to error or overload.

EXAMPLES

As described above, there are numerous generators which may be considered for the present invention, each with several torque control strategies, and all supplying electrical power to a load which itself may be subject to one of several control strategies. Below are specific examples of the present invention, using a few of the many possible combinations of generator, control technique, and load. The following examples are intended to be purely exemplary, and should not be construed to limit the present invention in any fashion.

Example 1

Changing a Resistive Load on a Generator

For example, the present invention may be used with a DC generator supplying a resistive load. Similar results will be obtained from a synchronous AC generator supplying a resistive load with no frequency regulation, or to an AC induction generator with passive supply of excitation, (e.g. a capacitive excitation supply). The immediate example will not work with an AC machine operating on a fixed frequency load.

An engine produces a mechanical power output. This mechanical power is converted by a generator into electrical power. The electrical power is fed to a resistive load where it is dissipated. Due to external control input, decreased power supply is needed (for example, a thermostat has signaled a state of sufficient heat). To reduce the engine power output, the fuel being consumed by the engine is reduced, which is done by slowing the engine down.

To slow the engine down, the torque load of the generator is increased. This may be accomplished by an increase in the power output of the generator.

The generator torque load may be increased by increasing the output current supplied to the load. This may be accomplished by a decrease in the resistance of the load on the generator. More current flows through the lower resistance, and causes the torque load of the generator to be immediately increased. The torque of the system is no longer in equilibrium, the torque of the engine being lower than the torque load of the generator. The speed of the engine decreases, and with it, the engine torque changes according to its torque speed characteristics. When the required engine power output, determined by the product of engine torque and speed, is reached, the load resistance is increased to reduce the generator torque load and restore engine/generator torque equilibrium. Since there is again equilibrium between torque and torque load, the system stops decelerating. At this point the engine is running at a lower speed and with an appropriate torque to maintain that speed and the generator's decreased power requirement is being met. A slightly different method is to decrease the load resistance, and to let the engine/generator system come to equilibrium with the new load resistance. As the engine/generator system slows down, the generator voltage automatically decreases, thus, decreasing the current flow through the resistive load. As the generator torque comes into equilibrium with the engine torque, the system speed will cease to change.

When an increased power supply is desired, the opposite is done. The torque load of the generator is decreased. The load resistance of a resistive load on the generator is increased. This causes the torque load of the generator and the torque of the engine to cease to be in equilibrium, and in this case the speed will increase. When the required engine power output is reached, an increased torque load is applied, equal to the torque output of the engine. The system ceases to accelerate since there is torque equilibrium.

Again, a single step process is possible in which the resistance of the electrical load is simply increased, and the engine/generator allowed to come to equilibrium with the new load.

With reference to FIG. 4, a graph of torque versus speed for both an internal combustion engine and for a DC generator with various resistive loads is shown. To simplify the example, the effects of armature reaction are ignored. Armature reaction is the factor that reduces the voltage output of a generator as its output current increases. Thus, the actual output of the generator will be somewhat different from the values calculated herein, in that the torque/speed curves for the generator will curve toward horizontal as torque increases, until a maximum current and torque is attained. However the general nature of the output changes will provide a valid example of the method of the present invention. Generator efficiency is also ignored.

The abscissa of the graph of FIG. 4 represents speed in radians per second, while the ordinate of the graph represents torque in newton meters. Curve M represents the torque of the engine, with positive ordinate values representing power output of the engine, that is torque in the direction of rotation. Curves G, G', G", G'", etc. represent the torque of the generator with various resistive loads, with positive ordinate values representing power consumption of the generator, that is torque in the direction opposite that of rotation. Curves G, G, G, G, etc. are labeled with the resistances placed on the generator for each curve. A circuit diagram for connecting the output of the generator to these various resistive loads is depicted by FIG. 1f. Each of resistive loads 77 represents a different resistance. They may be connected individually or in combination. A circuit diagram for connecting the output of the generator to a variable resistor is depicted by FIG. 1g. The resistive loads 77 or the variable resistor 78 could take the form of resistance heaters. A state of equilibrium is achieved when the total torque on the shaft between engine and generator is zero, that is, when engine torque output is equal to generator torque input. This is represented graphically by the intersection of an engine torque/speed curve and a generator-load torque/speed curve.

The example generator produces 2000 V output at 400 radians per second, with a maximum continuous current rating of 50 A, and a maximum rotational velocity of 500 radians per second. The example internal combustion engine has a slightly curved torque characteristic, ranging from 180 newton meters at its minimum speed of 50 radians per second, to a peak of 200 newton meters at 200 radians per second, decaying to 175 newton meters at its maximum rotational velocity of 400 radians per second.

For example, consider operation of the above system with a 25 ohm load. To describe the 25 ohm load line, two points of the line are calculated. The first point is the torque at zero speed. At a rotational velocity of 0 radians per second, the generator voltage will be 0, and thus, the current flowing through the load will be 0. Generator torque will therefore be 0. At a rotational velocity of 400 radians per second, the generator voltage will be 2000 V, and the current flowing through the load will be 80 amperes, an overload condition. The power output of the generator is 2000 V times, 80 A, or 160 kW. To provide 160 kW at 400 radians per second, the generator torque must be 400 newton meters. The intersection of this load line with the engine torque curve is at 200 radians per second and 200 newton meters. At a rotational velocity of 200 radians per second, the engine is providing a torque of 200 newton meters, or a power of 40 kW. The generator is locked to the engine at 200 radians per second, and with this particular resistive load is providing a torque load of 200 newton meters. Thus, the engine and generator are in torque equilibrium, and system power output is 40 kW.

When there is a change of operation to a 20 ohm load, the 20 ohm load line also passes through zero torque at zero speed. At 400 radians per second, the generator voltage is 2000 V, and the current through the load is 100 amperes, with a power output of 200 kW, and a generator torque of 500 newton meters. At 200 radians per second, the equilibrium point for a 25 ohm load, the generator voltage is 1000 V, the current through the load is 50 amperes, and the generator torque is 250 newton meters, considerably more than the torque output of the engine at 200 radians per second. The intersection of the 20 ohm load line and the engine torque curve may be determined graphically to be at about 158 radians per second, with a torque of 198 newton meters. The generator output voltage is 790 volts, and the current through the load is 39.5 amperes, for a power output of 31.2 kW. By decreasing the load resistance equilibrium operating point is changed and the power output of the engine/generator system is reduced, without the use of a throttle.

At the point that the load resistance is changed to 20 ohm resistance, with the system is at equilibrium with a 25 ohm load, with a power output of 40 kW and a rotational velocity of 200 radians per, at that instant, the generator is still rotating at 200 radians per second, and sourcing 1000 volts. 50 amperes will flow to the load, and at the instant of the change over, 50 kW is being supplied to the load, an increase in power output. However the engine/generator system is not in equilibrium, and will slow down, eventually reaching the desired lower power output level.

The load resistance may also be changed in a continual fashion, to reduce the surge of output power that occurs with a sudden load resistance change. Going to the opposite extreme, the load resistance may be changed beyond that required by the new equilibrium, to be restored to the equilibrium resistance when the appropriate value when the calculated system speed is reached. This will increase both power surges or deficits, and further increase the rate at which system speed changes.

Graphical or mathematical techniques, may be used to determine equilibrium power output of an engine/generator system given a particular resistive load.

Example 2

Changing the Excitation Frequency

Another way to change the torque load of a generator involves changing the excitation frequency of the generator, as described above. This changes the synchronous speed, and the difference in initial speed relative to the synchronous speed causes a generator torque change. This causes a changed electrical power output, a changed torque load, and acts to change the engine/generator speed. While these changes are taking place, the load on the generator will see a constantly changing power supply. If this is inappropriate, then excess power supplied will have to be diverted to a secondary load, and a reduced power supply will have to be supplemented from a separate power source. Change in synchronous speed is a technique applicable to AC generators, such as induction or synchronous machines.

In general, to slow down the heat engine, the excitation frequency will be decreased, and to speed up the heat engine, the excitation frequency will be increased. In the case of an AC induction generator operating in its normal operating range, torque changes in an essentially linear fashion about synchronous speed, with zero torque right at synchronous speed, a positive torque load for rotor speeds above synchronous speed, and negative torque loads (motoring operation) below synchronous speed. Real power output will change along with such changes in generator torque, and the electrical load on the generator is compatible with such power output changes, e.g., a resistive load as described above works during generator operation, whereas some sort of battery would be necessary for motoring operations.

It is possible to adjust the synchronous speed to achieve the desired change in a single step. However, large changes in synchronous speed could result in non-desired results. The torque/speed curves have maxima, and the trending in both directions towards equilibria only happens if the torque load is below the generator side maximum. Beyond that point, if the generator torque load is greater than the engine torque, the system may slow down towards equilibrium, but should the generator torque load be lower than the engine torque, then the system will accelerate and continue to do so. Therefore, when the system is to be sped up by a large amount, it may be necessary to change the generator torque load in stages, to produce a slower and more gradual change.

For example, a slow change may be appropriate if there were no energy storage, a slight lowering in power was desired, and the amount of time needed to reach the new power level was not a factor.

A fast change may be appropriate if there was an energy storage or supply, and the amount of time need to reach to the new power level was a factor.

With reference to FIG. 5, a graph of torque versus speed for both an internal combustion engine and for an AC induction generator connected to an excitation source operating at various frequencies is disclosed. The abscissa of the graph represents speed in radians per second, while the ordinate of the graph represents torque in newton meters. Curve M represents the torque of the engine, with positive ordinate values representing power output of the engine, that is torque in the direction of rotation. Curves G, G', G'', G''', etc. represent the torque of the generator with various excitation frequencies, with positive ordinate values representing power consumption of the generator, that is torque in the direction opposite that of rotation. Curves G, G', G'', G''', etc. are labeled with the excitation placed on the generator for each curve. In this particular instance, the excitation voltage is proportional to the excitation frequency, meaning that excitation remains constant. The power electronic drive/load must source or sink current as appropriate to maintain proper operating voltage. Note should also be made of the fact that on each curve, below the excitation frequency, the generator is operating as a motor. It is also useful to note that the generator will act as a motor, and produce torque, at zero speed.

Figure 2A:
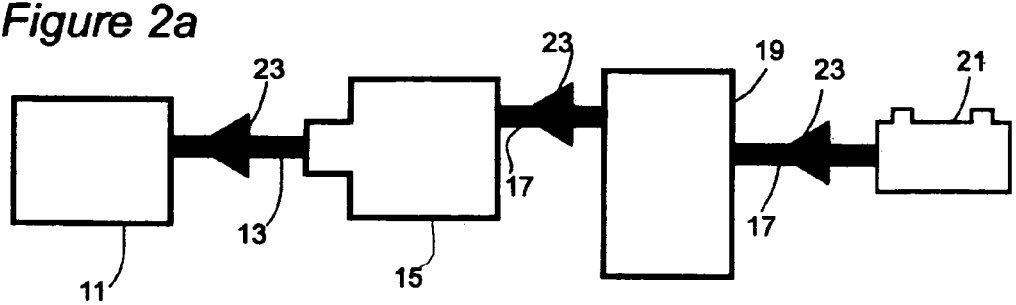
FIGS. 2a–2d illustrate the direction of power flows during operation of one embodiment of the present invention.
Figure 2B:
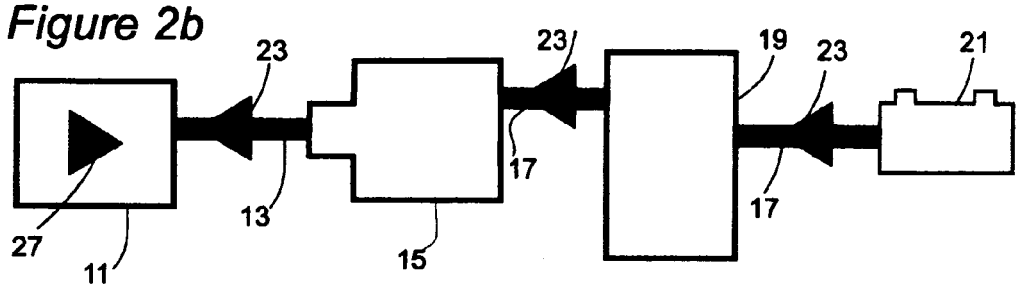
Figure 2C:
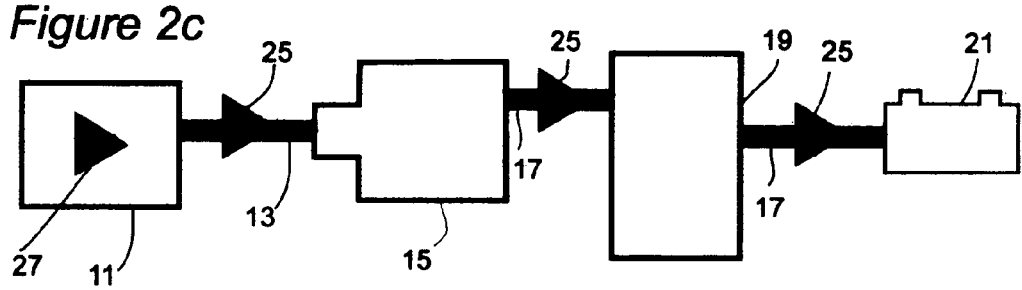
Figure 2D:
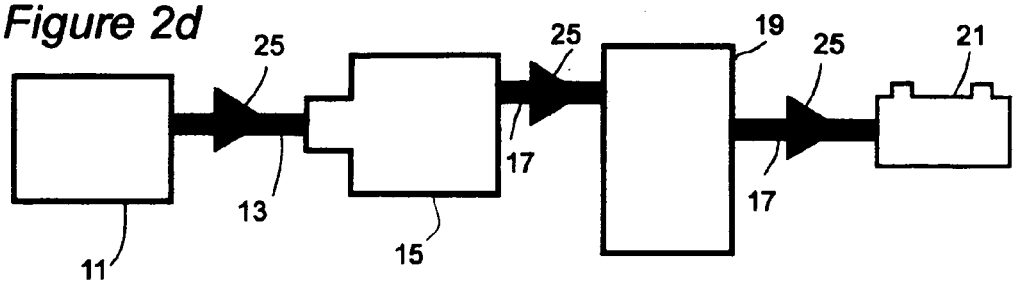

For example, consider an initial condition of the engine and generator not operating. FIGS. 2a–2d is referenced in this section. All of FIGS. 2a–2d show an engine 11 joined by a crank shaft 13 to a generator 15. A control mechanism 19—in this embodiment, taking the form of a power electronic load 19, and preferably an inverter, controls the electrical characteristics of the current between the generator 19 and an energy storage unit 21. The energy storage unit 21 would normally be connected to an end receiver of the generated electrical power; this end receiver is not shown. Power flows are shown by the bold arrows. The bold arrows 23, 25 and 27 point away from the source of current or torque, and towards the recipient. FIG. 2a shows the invention in starting mode. Glow plugs or other startup heat sources may be used in the engine. The power electronic control begins to synthesize alternating current at 100 radians per second (approximately 16 Hz), at suitable voltage for the generator in question. The power electronic control will source considerable current in order to maintain proper operating voltage. The generator will act as a motor, and cause the engine/generator system to start rotation. This may be seen in FIG. 2a. Bold arrows 23 show current being sourced from the energy storage unit 21 by the power electronic load 19, and transmitted to the generator 15, which applies a motoring torque to the crankshaft 13. The engine will consume fuel and air, and start producing power. This may be seen in FIG. 2b, which has the additional arrow 27, representing the torque output of the engine 11 also acting to accelerate the crankshaft 13. The combination of the torque provided by the engine and that provided by the generator will cause the engine/generator system to swiftly accelerate past synchronous speed. At this point, the generator will begin to convert mechanical power into electrical power, and placing a torque load on the system. This may be seen in FIG. 2c, in which bold arrows 25 replace bold arrows 23, showing that the torque of the crankshaft 13 is used by the generator 15, to provide a current to supply to the energy storage unit 21. However, bold arrow 27 remains, to show that the engine 11 is also still providing a torque to the crankshaft 13 to accelerate the crankshaft 13. At a system speed of about 108 radians per second, the generator torque will balance the engine torque, and the system will cease to accelerate. This is shown in FIG. 2d. Bold arrow 27 has disappeared, indicating that the engine is no longer providing an accelerating torque, and bold arrows 25 indicate that the engine 11 provides the torque to the crankshaft 13 which powers the generator 15 to generate electrical current for the energy storage unit 21. Power output will be about 21 kW.

The power electronic control 19 synthesizes alternating current at 200 radians per second, again as suitable voltage. The generator 15 is now operating on a new torque/speed curve, and at the current system speed of 100 radians per second will operate as a motor. This is analogous to FIG. 2b. The combination of engine 11 and generator 15 torques act to accelerate the system to approximately 208 radians per second. At this point, equilibrium will obtain with a power output of about 42 kw. During the initial acceleration phase, the system is actually absorbing power as may be seen by the direction of bold arrows 23, which must be supplied by energy storage 21 connected to the power electronic control 19.

For power output reduction, the drive frequency and synthesis speed is to be reduced. The reduction of drive frequency is limited by the maximum torque range of the generator. If the synchronous speed is reduced so much that generator torque is less than the torque output of the engine, then the system will start to accelerate and enter a runaway condition. A runaway condition occurs when the torque output is greater than the maximum torque load of the generator system, such that the speed will continue to increase until the internal friction of the heat engine prevents further speed increase, or until the system fails.

As mentioned above, small changes in synchronous speed may be used to cause slow changes in power output with only small surplus or deficit power output levels. In situations where such surplus or deficit power is not a problem, extremely rapid changes in power output may be effected. As described above, the example system is simply capable of starting the heat engine.

Specific values of torque, rotational velocity, torque versus slip, and slip are specific to the example engine and generator described above. Different implementations of heat engine connected to induction machine will operate at different torques, slips, and rotational velocities.

Another way to change the generator synchronous speed is to vary the number of magnetic poles developed in the generator. On way to do this is by taking advantage of the pole changing capabilities of motors and generators having high phase counts, such as a 30 phase generator.

Example 3

Power Electronic Pseudo-Resistive Load

A variable resistive load may be used to control the torque/speed characteristics of a generator, thereby obtaining control of engine/generator speed, engine mechanical power output, and thus, engine/generator electrical power output. Such a load need not be an actual resistor, but may be any load with a generally resistive character. Of specific interest are loads which have positive incremental resistance; loads for which current will increase when voltage increases, even if the ratio of current to voltage is not constant as it would be in a true resistor.

As noted above, there is generally an increase in output voltage as the generator speeds up. The value of positive incremental resistance is that as the voltage increases, the current drawn by the load will increase, increasing the torque load of the generator. A generator providing power to a load with positive incremental resistance will be stable to perturbations in prime mover speed, because an increase in prime mover speed will cause an increase in generator torque, acting to slow the system down, while a decrease in prime mover speed will cause a decrease in generator torque, acting to return system speed to the equilibrium value.

As mentioned above, switching power supplies may operate as constant power loads, which have negative incremental resistance, and can cause inherently unstable operation of an engine/generator system. However, switching power supplies may also act as resistive loads, and may be designed so as to act as pure resistors, or to simply have positive incremental resistance over part or all of their operational range. Of particular interest are switching power supplies that draw little or no current until a particular threshold voltage is reached, at which point they steeply increase their current draw as voltage is increased.

Referring to FIG. 4, the intersections of the high resistance load lines with the engine load line get increasingly shallower as power output increases. This means that the natural stability mentioned above will be reduced. Further, the rate at which engine speed changes in response to commanded change becomes less as power output increases. This situation may be enhanced through the use of pseudo-resistive loads.

With reference to FIG. 6, a power electronic load is designed so as to operate with positive incremental resistance. This load draws little or no current until a programmable threshold voltage, at which point current increases at a rate of 0.4 amp per 1 volt change, or an incremental resistance of 2.5 ohms. The power electronic load is further designed to not draw more than 50 amps, thus, preventing generator overload. Generator voltage is directly related to rotational speed, while generator torque is directly related to current draw, in this example using the same sample generator as example 1. Thus, each electrical load line, selected by selecting controller threshold voltage, may be assigned to a generator torque/speed curve.

With most resistive loads, system rotational speed, and thus, power output, is controlled by the equilibrium between generator torque/speed characteristic and engine torque/speed characteristic. Also, as most loads, the generator torque/speed characteristic is set by the electrical voltage/current characteristic of the load. The improvement is that power electronic load provides for a rapid change of torque versus speed about the desired equilibrium rotational velocity, thus, improving operational stability at the desired power output. Further, the current draw of a power electronic load may be limited to a maximum design to not overload the generator. The incremental resistance of a power electronic load is an aspect of its design, and may be tuned to a particular engine, generator, or load.

A power electronic pseudo resistive load may be used with a DC generator, with a synchronous generator, or with an induction generator, if excitation frequency is not fixed, for example with capacitor excitation. The embodiment may be understood with reference to FIG. 1b. Prime mover 11, which may be a heat engine, is connected via a shaft 13 to generator 15. Control mechanism 19 is connected to the output of generator 15. The control mechanism 19 in the present embodiment takes the form of a power electronic load, also referred to as a power electronic converter.

A power electronic load is quite similar to a power electronic power supply; the essential difference is in the feedback loop. In a power supply, the output is sampled, and errors in the output are corrected through suitable adjustment of the active control elements. In a power electronic load, the input is sampled, and errors in the input are corrected through suitable adjustment of the control elements. Both input side voltage and input current are sampled. The control element is adjusted so as to maintain a desired relationship between input voltage and input current. This may be done by maintaining a constant ratio between input voltage and input current, thereby synthesizing a resistive load. More complex voltage/current ratios may be designed for, and voltage/current ratio may be adjustable. Power electronic loads may also be programmed to sample the frequency of AC current input and maintain desired frequency characteristics.

With reference to FIG. 8, a block schematic diagram of an adjustable threshold constant incremental resistance power electronic load is depicted. The power electronic circuit itself is called in the art a boost converter. Electrical current flow is from the source (DC generator 15), through an inductor 47, through a switching control element (transistor) 43, and back to the source (DC generator) 15. A high voltage load in the figure shown as battery 21, is also connected to the switching control element 43, through a diode 49. In operation, the switching control element 43 is alternately closed and opened at a rapid rate. When the control element is closed, the source (DC generator 15) is short circuited through the inductor 47, storing energy. When the switching control element 43 is opened, the inductor 47 attempts to maintain current flow, and forces current through the high voltage load 21, dissipating the energy stored in the inductor 47.

The current flow from the source is controlled by the duty cycle of the switching control element 43. Normally, the output voltage would be sampled, and the input current would be adjusted to control output voltage. In the present usage, the input voltage is sampled by voltage sensor 35, and current is sampled by current sense 33. The input voltage and current are sampled prior to the switching control element 43. A threshold voltage 37 is subtracted from the input voltage using a rectifier 59. The voltage above threshold is now compared with a scaled voltage that is proportional to the current. This is done by comparator 39. Any difference between sensed current and desired current is used to drive an integrator PWM unit 41, which adjusts the switching control element 43. In the case that current flow is exactly that desired, the input to the integrator 41 will be constant, the integrator output will be constant, and the switching control element 43 will maintain its desired state.

With a power electronic load, the input is controlled, and the output is varied to maintain the appropriate input. For example, a power electronic load synthesizing a resistor will reduce its current consumption in the event that supply voltage is reduced. Output voltage and current will change as appropriate to the new power level. The output may be, for example, a high voltage traction battery used in a hybrid electric vehicle. The power supplied to this battery would change in a fashion controlled by the input voltage to the power electronic load.

Example 4

Power Electronic Pseudo-Resistive Load with Energy Storage

With the addition of energy storage needed for smooth supply of electrical power to the final load, additional options are available for a power electronic load. A suitably designed power electronic load may be capable of sourcing as well as absorbing power. In some cases, such capability is an inherent part of the load design, in other cases a load must be designed specifically for power sourcing applications. The embodiment may be understood with reference to FIG. 1a. Prime mover 11, which may be a heat engine, is connected via a shaft 13 to generator 15. Control mechanism 19 is connected to the output of generator 15, and is connected to an energy storage unit 21 and to an eventual load 22. The control mechanism 19 in the present embodiment takes the form of a power electronic load, also referred to as a power electronic converter. The power electronic load is capable of controlling the generator power output and also of sourcing power for the generator from the energy storage unit 21. The present example will function with a brush commutated DC generator, or with a brushless DC motor modified with suitable back diodes so as to be capable of generator operation.

The inverter drive for an induction generator must be capable of supplying power to the generator, operating the generator as a motor. This is necessitated by the fact that induction machines consume reactive power. Reactive power means that current and voltage are not in phase, and that energy is circulating between the generator and the inverter. An inverter must therefore include a small amount of energy storage, and must be capable of sourcing a small amount of energy. With the addition of more extensive energy storage on the DC link, the generator may be caused to act as a motor for an extended period.

In the case of a DC generator with independent excitation, the generator may be caused to act as a motor by reversing the flow of armature current through the machine. With reference to FIG. 7, a power electronic load is designed so as to operate with positive incremental resistance and with current sourcing. This "load" actually supplies 10 amperes of current until a programmable threshold voltage, at which point current consumption increases at a rate of 0.4 amp per 1 volt change, or an incremental resistance of 2.5 ohms. At 25 volts above the threshold voltage current is zero, and as voltage rises current consumption increases. The power electronic load is further designed to never draw more than 50 amps, thus, preventing generator overload. However, in conditions of excessive rotational velocity, the generator is allowed to go into overload in order to prevent an engine over-speed condition. The power electronic load supplies electrical power to a high voltage traction battery. Generator voltage is directly related to rotational speed, while generator torque is directly related to current draw, in this example using the same sample generator as example 1. Thus, each electrical load line, selected by selecting controller threshold voltage, may be assigned to a generator torque/speed curve.

Below the threshold voltage, current flows through the generator in the opposite direction of the generator produced voltage; electrical power is being supplied to the generator and the generator is acting as a motor. The power electronic load in this case is acting as a power electronic power supply, producing a terminal voltage which is greater than the generator voltage, thus, causing current flow through the generator. For the example generator, a current of 10 amperes corresponds to a force of 50 newton meters. As the threshold voltage is reached, current supplied to the generator is reduced, and the generator ceases to act as a motor, and begins to supply power to the load. Equilibrium between engine torque and generator torque load is as before; power output is adjusted by changing the position of this equilibrium by changing the threshold voltage.

Note that the transition between motor cranking, to start the engine, and generator operation, in order to generate electricity, is entirely automatic. If the engine is slow to start, then the engine will not produce torque, and the generator system will continue to act as a motor. Further, there is no need to know the exact speed of the engine. Rather, the threshold voltage is controlled based upon the desired power output. If the system power output is less than desired, then the threshold voltage is increased. Similarly, if too much power is being produced, then the threshold voltage is decreased. Power output may thus be controlled over a large power range.

A circuit may be implemented with the above DC active load with energy storage. With reference to FIG. 8A, a DC generator 15 is connected by means of an inductor 47, a transistor (switching control element) 43, and a diode 49 to a battery 21. The control circuitry, transistor drive circuitry, voltage and current detection means, as well as the specifics of the transistor and diode components, are also included. The battery voltage is higher than the generator voltage, and the configuration of inductor 47, transistor 43, and diode 49 is known as a boost converter. During operation, the transistor 43 is switched on and off at a rapid rate. When the transistor 43 is on, the generator 15 voltage is applied to the inductor 47, causing current to flow and energy to be stored in the inductor 47 magnetic field. When the transistor 43 is switched off, the energy stored in the inductor 47 is used to maintain current flow. The voltage across the inductor 47 changes, increasing to the point that the diode 49 conducts, and energy stored in the inductor 47 is supplied as a charging current to the battery 21.

with reference to FIG. 8B, the addition of an additional transistor 55 and diode 51 allow for similar operation with the additional capability of supplying power from the battery 21 to the generator 15. When operating as a load, transistor 43 is switched as above. With transistor 43 off, power supply capability is as follows. Transistor 55 is switched on. As the battery 21 voltage is greater than the generator 15 voltage, current flows through transistor 55, the inductor 47, and then to the generator 15. This causes the generator 15 to act as a motor. To regulate the current through the generator 15, transistor 55 may be switched at a rapid rate; the duty cycle of transistor 55 controlling the current supplied to the generator 15. The catch diode 51 and inductor 47 act to provide continuous current flow even as transistor 55 is switched on and off. When transistor 55 is switched off, the inductor will maintain current flow, the current flowing through the diode 49. Transistors 43 and 55 are restricted to not being on at the same time. Transistor 55, the catch diode 51, and the inductor 41 form a "buck" converter for supplying power from the battery 21 to the generator 15. It may be possible to dispense with the inductor 47 entirely, depending solely upon the natural inductance of the motor itself to provide current smoothing action.

Interface of this embodiment of the present invention to an external load is particularly easy. This may be seen on FIG. 1b. A load 22 is designed so as to consume power at the battery 21 nominal voltage. This may be, for example, the motor of an electric car, operated through a suitable controller. The generator controller, shown as input 65, monitors the state of charge of the battery 21, though the simple expedient of measuring actual battery voltage. The dotted lines electrical connectors 17 show this embodiment in which the input 65 (also referred to as the generator controller) takes a measurement from the voltage of the battery 21. In response to increasing depth of discharge, or to increasing rate of discharge, the generator controller shown as input 65 would command an increase in power electronic load 19 threshold voltage (37, in FIG. 8b). This would move the engine 11/generator 15 equilibrium point to higher speeds and power levels. Additional fuel would be consumed, additional power would be delivered to the battery 21, and the battery 21 would be recharged. As the battery 21 achieves full charge, or as the rate of discharge decreases, the input 65 would command a decrease in power electronic load 19 threshold voltage (37, in FIG. 8b). This reduces the speed of engine 11/generator 15 equilibrium, and less power would be delivered to the battery 21.

Example 5

Resistive Load with Excitation Control

Generator voltage is directly related to the rotational velocity of the generator rotor. Generator voltage is also directly related to excitation level. At the same rotational velocity, doubling excitation level will roughly double generator output voltage. Doubling excitation level will also double torque for a given output current level. The effects of armature reaction are ignored in this description, since they do not affect the general trends described. If excitation is doubled, with a constant resistive load, then output voltage will be doubled, current flowing through the load will double, and generator torque load and power output will increase by a factor of four. This increase in torque load will cause the engine/generator system to slow down.

Doubling the excitation level will have roughly the same effect as quartering load resistance. A change in excitation level may be understood having the same effect as a change in resistance equal to one over the square of the excitation change.

The method of the present example embodiment is applicable to DC generators with separate excitation. It is also applicable to AC synchronous generators with variable excitation when operating frequency independent loads.

In an exemplary embodiment, a diesel engine provides mechanical power to an AC synchronous generator with external excitation. Electrical power from the generator is used to operate an electrical resistance heater. The diesel engine has a fixed fuel injection setting.

When it is desired to increase the heat being produced by the heaters, the generator excitation is reduced. This causes the engine/generator system to speed up, until equilibrium is achieved at a higher rotational velocity, with higher voltage and current. When it is desired to reduce the heat being produced by the heaters, the generator excitation is reduced.

Example 6

Battery Load with Alternator

Of particular value for automotive applications is the use of an alternator as the generator. An alternator is essentially a brushless DC generator, comprising a stator with a three phase winding, and a wound rotor producing a suitable magnetic field, and suitable rectifiers on the stator circuit to provide a DC output. In most alternators, the excitation is provided by means of current supplied to the wound rotor by means of slip rings. Excitation is generally controlled in an automatic fashion in order to maintain a fixed output voltage over a wide load range. The alternator is of particular value because it is already in common use for automotive applications.

With reference to FIG. 9C, an engine 11 and alternator 63 connected for use in the method of the present invention is shown. In this case, the alternator 63 presents the primary load on the engine 11, rather than a minor secondary load. The three phase stator winding connects by means of the full wave rectifier 67 to the battery 21. Control is provided by means of excitation change, similar to example embodiment 5 described above. Excitation control is not shown, but is included in alternator 63. The battery 21, however, presents an extremely non-linear load. At low rotational velocity, alternator 63 output voltage is lower than battery 21 voltage, and the diodes 91 are back biased. Output current is thus, essentially zero, and alternator 63 torque load is minimal. As the alternator 63 output voltage becomes comparable to battery 21 voltage, current and torque increase rapidly, limited only by the extremely low resistances of the battery 21 circuit and by armature reaction. Input 65 represents an adjustable power setting. Inlet 61 represents the fuel and the air inlet to the engine. Shaft 13 connects between the engine and the alternator.

With reference to FIG. 9B, a graph of torque versus speed for both an internal combustion engine and for an alternator supplying a battery type load, operating at various levels of excitation is shown. The abscissa of the graph represents speed in radians per second, while the ordinate of the graph represents torque in newton meters. Curve M represents the torque of the engine, with positive ordinate values representing power output of the engine, that is torque in the direction of rotation. Curves G, G', G'',G''', etc. represent the torque of the alternator with various excitation levels, with positive ordinate values representing power consumption of the generator, that is torque in the direction opposite that of rotation. The exact location of the threshold points on the torque/speed curves will depend upon the state of charge of the battery, but the general nature of these curves will remain unchanged.

As may be noted from the diagram, engine/alternator power output is increased by a reduction in excitation, and reduced by an increase in excitation. This may be understood in the context of the present invention as follows: at a given equilibrium rotational velocity, an increase in excitation will cause an instantaneous increase in power output. This increased power output is not matched by engine power output, thus the engine/alternator system must slow down. This slowing stops when a new engine/alternator equilibrium is attained. Similarly, a reduction in excitation causes an instantaneous reduction in electrical power output, leaving the engine with excess power to accelerate the system. As the engine is operating in wide open throttle configuration, engine rotational velocity will determine fuel consumption and power output.

An automotive alternator does not normally act as a motor, as the rectifiers are passive commutation devices. However, with the addition of switching elements 93 and a rotor position sensor 69, an alternator may be modified to act as a brushless DC motor, a modification that allows the alternator to act as the starter for the heat engine.

Example 7

Generator in Engine Synchronized Periodic Motor Action

The introduction of energy storage and motoring of the generator permits further benefit to be had from the present invention. In heat engines, inertia (the energy of motion of an object) is an important factor. During the engine power cycle, inertia carries the pistons through the power absorbing strokes. To enhance this mechanical energy reserve, a flywheel is placed on the crankshaft to which the pistons are connected. The engine must be operating rapidly enough for sufficient energy to be stored in the motion of the flywheel to allow for the completion of power absorbing strokes. If the engine is operating too slowly, it will stall.

Traditionally, a small electric motor is used to start the engine. This motor, also known as the starter, is coupled to the engine and is started by closing a circuit to an independent energy source, usually a battery. When started, the starter rotates the engine until sufficient inertia is reached and one piston can carry the rest of the pistons through their power absorbing strokes on its own. Once the desired speed is reached, the starter is mechanically disconnected from the engine.

As mentioned above, numerous generator designs my be operated as motors, given suitable electronic control and a source of electrical power, such as a battery. The generator, temporarily acting as a motor, may replace the starter to initiate engine operation. Once the engine gains sufficient momentum, the generator is reset to its original function and the power is provided by the engine. This eliminates the need, and with it the cost and the complication, of a separate starter unit.

As described above, several generator/load combinations act as motors at low speed, transitioning to generator operation engine speed passes a particular threshold. In the method of the present invention, this threshold is controlled by various means suitable to the generator and load. Further, several generator/load combinations display rapid changes in torque with rotational velocity, meaning that a small change in rotational velocity will cause a large change in generator torque load. Such a "stiff" generator, if capable of motor operation, will act as the flywheel of the engine. During power absorbing strokes, the engine/generator system will slow down slightly, and the generator will begin to act as a motor, supplying the necessary energy to the pistons. During power strokes, the engine/generator system will speed up slightly, and the generator will output electrical power to the battery.

Similar results may be obtained through the use of a position sensing mechanism mechanically coupled to the engine, which would command the generator/load controller to appropriate torque levels at appropriate times during the engine power cycle. Such added complexity may beneficially improve efficiency.

There are two particular advantages to the present example embodiment. First, energy stored in a flywheel increases as the square of the rotational velocity. As the engine slows down, a point may be reached where insufficient energy is stored in the flywheel to carry the engine through energy absorbing strokes, and the engine will stall. The electrical energy storage does not show such a low speed limit; thus, an engine operated in the method of the present invention will be capable of operation at arbitrarily low speed, and thus, arbitrarily low power output. Second, the use of the generator and battery in place of the flywheel will allow for the use of single cylinder engines, which are simpler, have smaller surface area to volume ratios, and are more efficient.

Example 8

Another Embodiment of a Generator in Engine Synchronized Periodic Motor Action

A single cylinder diesel engine is coupled to an induction generator. The system is operated by electric control that is supplied with DC power by a battery. The electronic control is able to electronically manipulate the current and frequency of the power input to the induction generator. The control is further able to draw power from the battery and provide suitable AC excitation and power to the generator, or to supply suitable AC excitation to the generator while rectifying real power from the generator and supplying power to the battery.

Initiation of system operation is as follows. The control system operates as an inverter to synthesize alternating current of suitable voltage, frequency, and phase so as to cause the generator to operate as a motor, and accelerate the diesel engine to operational speed. The generator, driven by power provided by the control, from the battery, rotates the engine through the intake and compression strokes. Depending upon system inertia, generator torque, and generator synchronous speed, the system may reach the normal operating range at this point, or may take several power cycles for the system to reach the operating range. The normal operating range is that speed range from a few percent below to a few percent above the generator synchronous speed. At the operating range, during the power stroke, the system will speed up above the generator synchronous speed, causing the generator to produce electricity. Then during the power absorbing strokes, the system will slow down below generator synchronous speed, causing the generator to act as a motor, and provide mechanical power to push the heat engine through the power absorbing strokes. Through control of generator synchronous speed, the average system speed may be controlled, thereby controlling the power output of the system. It may be noted that there is no requirement to detect the actual speed of the engine, nor is there need for a sensor to determine the position of the engine in its power cycle. The engine will naturally vary its speed about the synchronous speed of the generator, and power production may be controlled through control of engine synchronous speed.

The above is a description of a single cylinder diesel engine coupled to an electric generator, and a battery, and operated by an electric control. While this description includes many specifics, these, and other descriptions disclosed above, should not be construed as limiting the scope of the invention in any way. For example, the diesel engine, mentioned in the model above, may be replaced with another heat engine equipped with any number of cylinders, or an Otto cycle engine, or a four cylinder gasoline engine. The engine may or may not be equipped with a turbocharger or an electric supercharger, depending on the manufacture preference. More than one engine may be used to drive the generator, for example, when two very different load modes may require an additional temporary power input, to supply the high load mode. In fact the invention is directed to a prime mover, which may or may not be an engine at all. For example, a water turbine in a dam could utilize the present invention as its control technique, as could other prime movers. It is only for clarity in reading that the prime mover has been referred to almost throughout this specification as an engine, and more specifically, as a heat engine.

The method of the present invention controls the prime mover "fuel" consumption by the motion of the prime mover. Thus, the present invention is suitable for internal combustion engines, pressure operated reciprocating engines, turbine systems over restricted speed ranges, etc. As an example of a system for which the method of the present invention is unsuitable, one may consider a wind turbine, in which the wind blows weather power is being consumed or not. Similarly, a standard twin shaft gas turbine engine, in which the power output shaft is not directly connected to the compressor or fuel supply.

More than one generator may be coupled to the engine as a result of space requirements, separate operational need or other consideration. The engine may be coupled, in addition to the generator, directly to the load; for example, in a vehicle, the engine may be, in addition, coupled to the wheels. As in the model, any type of generator may be used for the conversion of the mechanical power to electrical power. Any type of generator that is capable of acting as a motor may be used in an embodiment that takes advantage of this capability. The present invention teaches how control could be effected without the need for throttle control. There are however embodiments in which a throttle would be part of the engine generator system, e.g., for shutdown, or as a safety device. Power electronic devices for the control and conversion of the electrical power are not limited to those listed, but may include any power electronic switches, including gas discharge devices, mechanical switches, silicon devices, and vacuum microelectronics devices. The extent of the control might range from the manipulation of the generator's output, through control over the generator's excitation levels, to the additional control over the engine's fuel and air intake. Operation is not limited to the ideal combination of engine speed, winding power and generator electric load, although the invention facilitates operation at such ideal parameters. Direct feedback of heat engine speed may be used to allow the power electronic control to anticipate power output corrections. In addition, other feedback parameters such as engine and winding heat, oxygen concentration in the exhaust path, etc, may be collected, depending on the machine function, to reflect the difference between the given condition and the desired one. The power electronic control system may control system rate of speed change, as well as system speed. The power electronic control system may include predictive capability to anticipate future power requirements, and to select power output levels accordingly. The generator controller used to alter the synchronous speed of the generator according to the methods described may include standard field oriented control techniques, which allow the control of electrical machine torque versus speed relations.

While inherently stable embodiments have been described, in which small changes in system speed cause immediate changes in power consumption which restore the system to the desired equilibrium speed, such is not a necessary requirement. The requirement of equilibrium may be met through the use of unstable equilibrium, for example a DC generator supplying a constant power switching load.

In such a case, active changes in load power consumption will be needed to maintain system speed, however the unstable nature of the engine/generator equilibrium may enhance the speed with which power output levels may be changed. There are also embodiments in which a further controlling step will prove necessary, to cause the engine and generator to be in an equilibrium state, so that the engine stops changing speed.

There have been described embodiments in which the focus is on the change of power output of the engine, via generator control. Another application of the present invention is with the use of an induction generator having a very high torque to speed relation around synchronous speed. Through this, the generator fluctuates between generating and motoring modes throughout the engine power production cycle itself. As a result, the engine never slows down dramatically during power absorbing strokes, to speed up again dramatically in power production strokes. In such an embodiment, used perhaps in a electricity generation unit, the generator may, or may not also provide control over the output of engine; indeed a throttle may be used to control engine power output.

Some embodiments may use a more limited and some a more expanded control depending on their specific needs. An energy storage unit, such as a battery, may or may not be used. The benefits from the use of the present invention are especially apparent when the invention is utilized in hybrid electric vehicles, heavy machinery and off grid electricity production.

The need for cleaner, more efficient drive means is well established in these fields. However, the benefits of the present invention are not limited only to these examples. In times when environment issues are in the interest of both the public and the legislator, cleaner and more efficient means to produce electrical power are clearly useful and have a great commercial potential.

While this invention has been described with reference to illustrative embodiments, it is to be understood that this description is not intended to be construed in a limiting sense. Modifications to and combinations of the illustrative embodiments will be apparent to persons skilled in the art upon reference to this description. It is to be further understood, therefore, that changes in the details of the embodiments of the present invention and additional embodiments of the present invention will be apparent to persons of ordinary skill in the art having reference to this description. It is contemplated that such changes and additional embodiments are within the spirit and true scope of the invention as claimed below.

What is claimed is:

1. A method for controlling a power output of a prime mover, comprising
   a) receiving a signal indicating a changing power output requirement of the prime movers, comprising sampling a difference between a power output of the prime mover and a power output requirement of the prime mover;
   b) adjusting a torque load on the prime mover according to the steps:
      i) increasing the torque load when said signal is indicating a decreasing power output requirement,
      ii) decreasing the torque load when said signal is indicating an increasing power output requirements,
      iii) equalizing the torque load on the prime mover with the power output when said signal is indicating a maintaining of power output.

2. The method of claim 1 wherein said step of increasing the torque load is accomplished by applying a predetermined torque load increment as many times as necessary until the prime mover achieves the required power output decrease; and wherein said step of decreasing the torque load is accomplished by applying a predetermined torque load decrease as many times as necessary until the prime mover achieves the required power output increase.

3. The method of claim 1 wherein said step of adjusting the torque load comprises immediately applying the determined torque load.

4. The method of claim 1 wherein said step of adjusting the torque load comprises applying the determined torque load in a number of graduated stages of changed torque load.

5. The method of claim 1 wherein said step of adjusting the torque load comprises varying a transmission connecting the prime mover and a mechanical load.

6. A method for controlling a power output of a prime mover, comprising:
   a) receiving a signal indicating a changing power output requirement of the prime mover;
   b) adjusting a torque load on the prime mover according to the step:
      i) increasing the torque load when said signal is indicating a decreasing power output
      ii) decreasing the torque load when said signal is indicating an increasing power output requirement,
      iii) equalizing the torque load on the prime mover with the power output when said signal is indicating a maintaining of power output;
   and wherein said step of adjusting the torque load comprises:
      i) connecting an output shaft of the prime mover to a generator;
      ii) connecting the generator to a variable resistance electrical load; and
      iii) varying the resistance of the electrical load.

7. The method of claim 6 further comprising the step of: producing an excess electrical power by the generator and storing said excess.

8. The method of claim 7 wherein said step of producing an excess electrical power occurs during a power-producing stroke of the prime mover or during periods of reducing prime mover speed.

9. The method of claim 6 further comprising the step of sourcing extra electrical power during a non-power producing stroke of the prime mover and during periods of increasing prime mover speed.

10. The method of claim 9 further comprising the steps of:
    a) detecting said non-power producing stroke; and
    b) reducing the torque loud during said non-power producing stroke.

11. The method of claim 10 wherein said detecting step comprises a detecting step selected from the group consisting of: sensing a rotary angle of the prime mover, and sensing a piston position of the prime mover.

12. The method of claim 6 wherein the step of varying the resistance of the electrical load comprises the steps of:
    a) establishing a threshold voltage;
    b) substantially preventing a current flow to the electrical load when an output voltage of said generator is below said threshold voltage, and allowing a current to flow to the electrical load when an output voltage of said generator is above said threshold voltage;
    c) adjusting the threshold voltage to increase or to decrease the electrical current flow to the electrical load.

13. The method of claim 12 wherein said step of preventing a current flow comprises steeply decreasing the current flow to the electrical load substantially immediately following any drop in output voltage.

14. The method of claim 12 further comprising the steps of
   a) producing electrical power by means of an auxiliary power supply;
   b) applying said electrical power to the generator when the output voltage of the generator falls below said threshold voltage.

15. The method of claim 14 wherein a current versus voltage characteristic of the generator causes an automatic transition of generator to motor action.

16. The method of claim 6 further comprising the step of starting the prime-mover and generator, where the generator is of the type that can operate as a motor, comprising the steps:
   a) receiving a command to start system,
   b) synthesizing electricity of suitable voltage and current characteristics from an auxiliary energy supply to enable the generator to rotate the prime mover, and providing a fuel source and associated starting requirements to said prime mover.

* * * * *